(12) United States Patent
Squire et al.

(10) Patent No.: US 9,068,034 B2
(45) Date of Patent: Jun. 30, 2015

(54) IN-REACTOR POLYMER BLENDS

(75) Inventors: Kevin R. Squire, Kingwood, TX (US);
Charles J. Ruff, Houston, TX (US);
Cesar A. Garcia-Franco, Houston, TX
(US); Peijun Jiang, League City, TX
(US)

(73) Assignee: ExxonMobil Chemical Patents Inc.,
Baytown, TX (US)

( * ) Notice: Subject to any disclaimer, the term of this
patent is extended or adjusted under 35
U.S.C. 154(b) by 512 days.

(21) Appl. No.: 13/609,593

(22) Filed: Sep. 11, 2012

(65) Prior Publication Data

US 2013/0005908 A1 Jan. 3, 2013

Related U.S. Application Data

(60) Division of application No. 12/638,895, filed on Dec. 15, 2009, now Pat. No. 8,288,480, which is a continuation-in-part of application No. 11/296,830, filed on Dec. 7, 2005, now Pat. No. 7,935,760, said application No. 13/609,593 is a continuation-in-part of application No. 12/335,252, filed on Dec. 15, 2008, now Pat. No. 8,022,142.

(60) Provisional application No. 60/693,030, filed on Jun. 22, 2005.

(51) Int. Cl.
| | |
|---|---|
| C08F 8/00 | (2006.01) |
| C08L 23/04 | (2006.01) |
| C08L 23/10 | (2006.01) |
| C08F 210/18 | (2006.01) |
| C08L 23/14 | (2006.01) |

(52) U.S. Cl.
CPC .............. C08F 210/18 (2013.01); C08L 23/145 (2013.01); *C08L 2205/02* (2013.01); *C08L 2205/025* (2013.01); *C08L 2308/00* (2013.01)

(58) Field of Classification Search
CPC .......... C08F 210/18; C08F 2/00; C08F 2/001; C08F 210/06; C08F 232/00; C08F 2500/25; C08F 2500/17; C08F 2500/03; C08F 2500/20; C08L 23/145; C08L 2205/02; C08L 2205/025; C08L 2308/00; C08L 2666/06
USPC ................................. 525/197, 211, 232, 240
See application file for complete search history.

(56) References Cited

U.S. PATENT DOCUMENTS

| | | | |
|---|---|---|---|
| 4,999,403 | A | 3/1991 | Datta et al. |
| 5,504,171 | A | 4/1996 | Etherton et al. |
| 5,514,761 | A | 5/1996 | Etherton et al. |
| 5,786,403 | A | 7/1998 | Okada et al. |
| 5,925,448 | A | 7/1999 | Moy et al. |
| 6,300,451 | B1 | 10/2001 | Mehta et al. |
| 6,642,316 | B1 | 11/2003 | Datta et al. |
| 6,660,809 | B1 | 12/2003 | Weng et al. |
| 6,750,307 | B2 | 6/2004 | Weng et al. |
| 6,774,191 | B2 | 8/2004 | Weng et al. |
| 6,800,669 | B2 | 10/2004 | Thoen et al. |
| 7,101,936 | B2 | 9/2006 | Weng et al. |
| 7,935,760 | B2 * | 5/2011 | Jiang et al. ..................... 525/191 |
| 8,022,142 | B2 | 9/2011 | Jiang et al. |
| 8,106,127 | B2 * | 1/2012 | De Gracia et al. ............. 525/191 |
| 8,288,480 | B2 * | 10/2012 | Jiang et al. ..................... 525/191 |
| 8,436,100 | B2 * | 5/2013 | Jiang et al. ..................... 525/240 |
| 2004/0260025 | A1 | 12/2004 | Ravishankar et al. |
| 2007/0260016 | A1 | 11/2007 | Best et al. |
| 2009/0247656 | A1 | 10/2009 | Jacob et al. |

FOREIGN PATENT DOCUMENTS

| | | |
|---|---|---|
| EP | 0 129 368 | 7/1989 |
| EP | 0 366 411 | 5/1990 |
| EP | 0 784 062 | 7/1997 |
| WO | WO 97/08216 | 3/1997 |
| WO | WO 98/27154 | 6/1998 |
| WO | WO 2007/001644 | 1/2007 |

OTHER PUBLICATIONS

Garcia-Franco et al., *Similarities Between Gelation and Long Chain Branching Viscoelastic Behavior*, Macromolecules, Communications to the Editor, 2001, vol. 34, No. 10, pp. 3115-3117.
Lohse et al., *Graft Copolymer Compatibilizers for Blends of Polypropylene and Ethylene-Propylene Copolymers*, Macromolecules, 1991, vol. 24, No. 2, pp. 561-566.
Monkkonen et al., *Synthesis and Characterization of Poly(ethylene-co-norbornadiene)*, Macromolecular Chemistry and Physics, 1999, vol. 200, No. 12, pp. 2623-2628.
Paavola et al., *Propylene Copolymerization With Non-conjugated Dienes and α-olefins Using Supported Metallocene Catalyst*, Polymer, 2004, vol. 45, No. 7, pp. 2099-2110.
Radhakrishnan et al., *Copolymerization of Ethylene with 2,5-norbornadiene Using a Homogeneous Metallocene/MAO Catalyst System*, Macromolecular Chemistry and Physics, 1999, vol. 200, No. 4, pp. 858-862.
Tynys et al., *Copolymerisation of 1,9-decadiene and Propylene With Binary and Isolated Metallocene Systems*, Polymer, 2007, vol. 48, No. 10, pp. 2793-2805.
Weng et al., *Long Chain Branched Isotactic Polypropylene*, Macromolecules, 2002, vol. 35, No. 10, pp. 3838-3843.
Wood-Adams et al., *Effect of Molecular Structure on the Linear Viscoelastic Behavior of Polyethylene*, Macromolecules, 2000, vol. 33, No. 20, pp. 7489-7499.
Yanjarappa et al., *A Study of Copolymerization of 1-Hexene with 2,5-Norbornadiene Using Metallocene Catalysts*, Macromolecular Chemistry and Physics, 2004, vol. 205, pp. 2055-2063.
Ye et al., *Synthesis and Rheological Properties of Long-Chain-Branched Isotactic Polypropylenes Prepared by Copolymerization of Propylene and Nonconjugated Dienes*, Ind. Eng. Chem. Res., 2004, vol. 43, No. 11, pp. 2860-2870.

* cited by examiner

*Primary Examiner* — Nathan M Nutter
(74) *Attorney, Agent, or Firm* — Catherine L. Bell

(57) ABSTRACT

This invention relates to in-reactor polymer blends comprising at least 60 mole % of propylene and from 0.01 to 10 mole % of at least one diene selected from the group of $C_6$ to $C_{12}$ α,ω-diene, norbornadiene, vinyl norbornene and mixtures thereof with the balance being ethylene. The blend comprises first and second polymers having different crystallinities and or different Tg's.

14 Claims, 7 Drawing Sheets

IN-REACTOR POLYMER BLENDS

CROSS-REFERENCE TO RELATED APPLICATIONS

This application is a divisional of U.S. patent application Ser. No. 12/638,895, filed Dec. 15, 2009 now U.S. Pat. No. 8,288,480, which is a continuation-in-part of U.S. Ser. No. 11/296,830 filed Dec. 7, 2005, now granted as U.S. Pat. No. 7,935,760, which claims the benefit of and priority to U.S. Ser. No. 60/693,030, filed Jun. 22, 2005. This application is also a continuation-in-part of U.S. Ser. No. 12/335,252 filed Dec. 15, 2008, now granted as U.S. Pat. No. 8,022,142.

FIELD OF THE INVENTION

This invention relates to in-reactor polymer blends containing controlled levels of cross-products, their production and their use in forming molded components.

BACKGROUND OF THE INVENTION

Thermoplastic olefins (TPOs), impact copolymers (ICPs), and thermoplastic vulcanizates (TPVs), collectively referred to herein as "toughened polymer blends", typically comprise a crystalline thermoplastic component and a high molecular weight or crosslinked elastomeric component. These toughened polymer blends often have multiphase morphology where the thermoplastic component, such as isotactic polypropylene (often referred as the hard phase), forms a continuous matrix phase and the elastomeric component (often referred as the soft phase), generally derived from an ethylene containing copolymer, is the dispersed component. The polypropylene matrix imparts tensile strength and chemical resistance to the blends, while the ethylene copolymer imparts flexibility and impact resistance. For some compositions the elastomeric phase is the continuous matrix phase, and the hard phase is dispersed. These soft blends are known as thermoplastic rubbers (TPRs).

TPOs and TPVs are typically mixed in extruders and contain no cross-products between the blend components. Although ICPs can also be produced by mechanical blending, today most are made as in-reactor blends. Porous isotactic polypropylene particles are produced in a slurry polymerization process in a first stage, and the particles are coated with ethylene-propylene rubber in a second gas phase polymerization stage. Such in-reactor blending of ICPs is generally preferred since in-reactor blends not only provide lower production costs but also offer the possibility of improved mechanical properties through more intimate mixing between the hard and soft phases. Cross-products can also be formed in the ICP process but are at very low levels because the EP rubber is polymerized in the gas phase while the iPP is already a solid.

Datta, et al [D. J. Lohse, S. Datta, and E. N. Kresge, Macromolecules 24, 561 (1991)] describe EP backbones functionalized with cyclic diolefins by terpolymerization of ethylene, propylene and diolefin. The statistically functionalized EP "soft" block is then copolymerized with propylene in the presence of a Ziegler-Natta catalyst capable of producing isotactic polypropylene. In this way, the authors speculate that some of the "hard" block polypropylene chains are grafted through the residual olefinic unsaturation onto the EP "soft" block previously formed. No NMR, GPC-3D, or small angle oscillatory shear data are presented in this paper to prove the existence of cross-products. The paper reports the presence of materials that extract at intermediate temperatures between EP (boiling hexane) and iPP (boiling xylenes), but more recent work has shown that these products cannot be EP-iPP cross-products, since the latter extract with the iPP. See also, EP-A-0 366411.

U.S. Pat. No. 4,999,403 describes similar graft copolymer compounds where functional groups, such as amines or alcohols, in the EPR backbone are used for grafting isotactic polypropylene having maleic anhydride reactive groups. The synthesis of these functionalized EPRs and iPPs involves polar reagents, and the final product contains polar bonds. The graft copolymers are said to be useful as compatibilizer compounds for blends of isotactic polypropylene and ethylene-propylene rubber. A limitation of this class of reactions, in which chains with multiple functionalities are used in subsequent reactions, is the formation of undesirable high molecular weight material typically referred to as gel in the art.

U.S. Pat. Nos. 5,504,171 and 5,514,761 disclose α-olefin/α,ω-diene copolymers, which are generally crystalline, free of gel and crosslinks, and contain unsaturated side chains and long chain branching. The copolymers contain up to 5 mole percent diene incorporated therein, and may be prepared by copolymerization using a solid-phase, insoluble coordination catalyst, such as Ziegler-type catalyst, without a solvent, and below the crystalline melting point of the copolymer. Soluble catalysts, such as, a biscyclopentadienyltitanium(IV)dichloride-aluminum alkyl system, are said to be generally unsuitable because the second terminal bond of the α,ω-diene is not protected from the catalyst and remains available for reaction in a gel-forming polymerization reaction. Cross-products could not form in these polymers, because a second polymerization stage is not used.

U.S. Pat. Nos. 6,660,809, 6,750,307 and 6,774,191 disclose a branched olefin copolymer having an isotactic polypropylene backbone, polyethylene branches and, optionally, one or more comonomers, but no dienes. The total copolymer is produced by a) copolymerizing ethylene, optionally with one or more copolymerizable monomers, in a polymerization reaction under conditions sufficient to form copolymer having greater than 40% chain end-group unsaturation; b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering the branched olefin copolymer.

One of the problems with existing methods of producing in-reactor polymer blends is that the amount of cross-products tends to be very low, typically less than 5 mole % of the overall blend. Since these cross-products frequently influence the material flow and mechanical properties of the final blend, it would be desirable to be able to control the amount of the cross-products and particularly to increase the amount to high levels, such as at least 20 mole %, preferably at least 50 mole %, and most preferably 100 mole %.

According to the invention, there is provided a novel method of producing in-reactor polymer blends, which allows control of the production of cross-products up to a high level, and novel in-reactor polymer blends produced by such method.

SUMMARY OF THE INVENTION

In one aspect, the invention resides in an in-reactor polymer blend comprising at least 60 mole % of propylene and from 0.01 to 10 mole % of at least one diene selected from the group consisting of $C_6$ to $C_{12}$ α,ω-dienes, norbornadiene, vinyl norbornene and mixtures thereof with the balance being ethylene, wherein the blend comprises first and second polymers having different crystallinities (and optionally different glass transition temperatures) in which at least the second polymer comprises at least one branch of the first polymer per 10,000 carbon atoms of the in-reactor blend as observed by $^{13}$C NMR, wherein the blend has the following properties:

a) a highest melting temperature of 120° C. or more and a lowest glass transition temperature of −20° C. or less as determined by Differential Scanning Calorimetry (second melt);

(b) a branching index (g') of 0.9 or less as determined by the formula:

$$g' = \frac{\eta_b}{\eta_l}$$

where $\eta_b$ is the intrinsic viscosity of the in-reactor polymer blend and $\eta_l$ is the intrinsic viscosity of a linear polypropylene of the same viscosity-averaged molecular weight ($M_v$) as the in-reactor polymer blend, where $\eta_l = KM_v^\alpha$, where K=0.0002288 and α=0.705;

(c) a critical relaxation exponent, n, of greater than 0 and less or equal to 0.8; and (d) at least 90 wt, % of the blend is soluble in refluxing xylenes at 138° C.

By highest melting temperature is meant that if there is more than one melting temperature on the DSC trace, the highest shall be used. By lowest glass transition temperature is meant that if there is more than one Tg on the DSC trace, then the lowest shall be used.

In another aspect, the invention resides in an in-reactor polymer blend comprising at least 60 mole % of propylene and from 0.01 to 10 mole % of at least one diene selected from the group consisting of $C_6$ to $C_{12}$ α,ω-dienes, norbornadiene, vinyl norbornene and mixtures thereof with the balance being ethylene, wherein the blend comprises first and second polymers having different crystallinities (and preferably different Tg's) in which at least the second polymer comprises at least one branch of the first polymer per 10,000 carbon atoms as observed by $^{13}$C NMR, wherein the blend has the following properties:

a) a first melting temperature of 120° C. or more (alternately 130° C. or more) and a first glass transition temperature, Tg, of 20° C. or less (alternately −20° C. or less) as determined by Differential Scanning Calorimetry (first melt);

(b) optionally, a second melting temperature at least 20° C. different than the first melting temperature as determined by Differential Scanning Calorimetry (first melt) or a second Tg at least 20° C. different than the first Tg as determined by Differential Scanning Calorimetry (first melt);

(c) a branching index (g') of 0.9 or less as determined by the formula:

$$g' = \frac{\eta_b}{\eta_l}$$

where $\eta_b$ is the intrinsic viscosity of the in-reactor polymer blend and $\eta_l$ is the intrinsic viscosity of a linear polypropylene of the same viscosity-averaged molecular weight ($M_v$) as the in-reactor polymer blend, where $\eta_l = KM_v^\alpha$, where K=0.0002288 and α=0.705;

(d) a critical relaxation exponent, n, of greater than 0 and less or equal to 0.8; and (e) at least 90 wt % of the blend is soluble in refluxing xylenes at 138° C.

By different crystallinities is meant that the crystallinities differ by at least 5% with respect to each other, preferably at least 10%, preferably at least 20%, preferably by at least 30%. By different Tg's is meant that the Tg's differ by at least 5% with respect to each other, preferably at least 10%, preferably at least 20%, preferably by at least 30%.

Conveniently, said second melting temperature is at least 40° C. and is at least 20° C. less than the first melting temperature.

Conveniently, said first polymer is a propylene/ethylene copolymer and said second polymer is a propylene homopolymer. Alternatively, said first polymer is a propylene homopolymer and said second polymer is a propylene/ethylene copolymer. Alternatively, the first polymer is a propylene/ethylene copolymer with a low ethylene content (e.g., less than 20 mole %, preferably less than 15 mole %, preferably less than 10 mole %, preferably less than 5 mole %) and said second polymer is a propylene/ethylene copolymer with higher ethylene content (e.g., at least 5 mole % higher, preferably at least 10 mole % higher, preferably at least 15 mole % higher, preferably at least 20 mole % higher, preferably at least 25 mole % higher). Alternatively, the first polymer is a propylene/ethylene copolymer with a high ethylene content (e.g., at least 20 mole %, preferably at least 25 mole %) and said second polymer is propylene/ethylene copolymer with a lower ethylene content (e.g., at least 5 mole % lower, preferably at least 10 mole % lower, preferably at least 15 mole % lower, preferably at least 20 mole % lower, preferably at least 25 mole % lower).

Conveniently, said at least one diene comprises 1,9-decadiene or vinyl norbornene. Alternatively, said at least one diene comprises norbornadiene.

In a further aspect, the invention resides in an in-reactor polymer blend comprising at least 80 mole % of ethylene and from 0.01 to 10 mole % of at least one diene selected from the group consisting of norbornadiene, vinyl norbornene, $C_6$ to $C_{12}$ α,ω-dienes, and mixtures thereof with the balance being an alpha-olefin selected from the group consisting of propylene, butene, pentene, hexene, and mixtures thereof wherein the blend comprises first and second polymers having different crystallinities (and optionally different Tg's) in which at least the second polymer comprises at least one branch of the first polymer having 8 or more carbon atoms per 10,000 carbon atoms as observed by $^{13}$C NMR, wherein the blend has the following properties:

(a) a first melting temperature of 70° C. or more and a first Tg of 20° C. or less as determined by Differential Scanning Calorimetry (second melt);

(b) a second melting temperature at least 20° C. different than the first melting temperature as determined by Differential Scanning Calorimetry (second melt) or a second Tg at least 20° C. different than the first Tg as determined by Differential Scanning Calorimetry (second melt);

(c) at least one branch point per 10,000 carbon atoms, as determined by $^{13}$Carbon NMR; and (d) a critical relaxation exponent, n, of greater than 0 and less or equal to 0.8.

In a further aspect, the invention resides in an in-reactor polymer blend comprising at least 80 mole % of ethylene and from 0.01 to 10 mole % of at least one diene selected from the group consisting of norbornadiene, vinyl norbornene, $C_6$ to $C_{12}$ α,ω-dienes, and mixtures thereof with the balance being an alpha-olefin selected from the group consisting of propylene, butene, pentene, hexene, and mixtures thereof wherein the blend comprises first and second polymers having different crystallinities in which at least the second polymer comprises at least one branch of the first polymer having 8 or more carbon atoms per 10,000 carbon atoms as observed by $^{13}$C NMR, wherein the blend has the following properties:

(a) a first melting temperature of 70° C. or more and a first Tg of 20° C. or less as determined by Differential Scanning Calorimetry (first melt);

(b) a second melting temperature at least 20° C. different than the first melting temperature as determined by Differential Scanning Calorimetry (first melt) or a second Tg at least 20° C. different than the first Tg as determined by Differential Scanning Calorimetry (first melt);

(c) at least one branch point per 10,000 carbon atoms, as determined by $^{13}$Carbon NMR; and (d) a critical relaxation exponent, n, of greater than 0 and less or equal to 0.8.

Conveniently, at least 90 wt % of the blend is soluble in refluxing xylenes at 138° C.

Conveniently, the in-reactor blend contains at least 0.25 viscosity fraction of chains with relaxation times of 100 seconds.

Conveniently, the secant slope of the log(dynamic viscosity) versus log(frequency) curve measured in small angle oscillatory shear experiments is less than –0.25.

In yet a further aspect, the invention resides in a process for producing an in-reactor polymer blend described herein, the process comprising:

(i) contacting a first monomer composition comprising propylene, from 0.01 to 10 mole % of one or more dienes selected from the group consisting of $C_6$ to $C_{12}$ α,ω-dienes, norbornadiene, vinylnorbornene, and mixtures thereof and optionally ethylene in a first polymerization stage with a metallocene first catalyst which is capable of polymerizing said first monomer composition to produce a first polymer and which is also capable of incorporating said diene into the first polymer such that the product of the first polymerization stage is a propylene-containing first polymer comprising more than one olefinic unsaturation per chain and from 0.1 to 10 mole % diene; and (ii) contacting at least part of the product of the first polymerization stage with a second monomer composition comprising propylene and optionally ethylene in a second polymerization stage with a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition and wherein the partial pressure of said second monomer composition is kept below 1,000 kPa during said second polymerization stage.

In still yet a further aspect, the invention resides in a process for producing an in-reactor polymer blend described herein, the process comprising:

(i) contacting a first monomer composition comprising ethylene, from 0.01 to 10 mole % of one or more dienes selected from the group consisting of $C_6$ to $C_{12}$ α,ω-dienes, norbornadiene, vinylnorbornene, and mixtures thereof and optionally one or more additional olefin selected from propylene, butene, pentene, hexene and mixtures thereof in a first polymerization stage with a metallocene first catalyst which is capable of polymerizing said first monomer composition to produce a first polymer and which is also capable of incorporating said diene into the first polymer such that the product of the first polymerization stage is an ethylene-containing first polymer comprising more than one olefinic unsaturation per chain and from 0.1 to 10 mole % diene; and (ii) contacting at least part of the product of the first polymerization stage with a second monomer composition comprising propylene and optionally ethylene in a second polymerization stage with a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition.

Conveniently, said first polymerization stage is conducted in the presence of hydrogen.

Conveniently, the second catalyst comprises at least one metallocene catalyst.

DETAILED DESCRIPTION OF THE EMBODIMENTS

Figure 1:
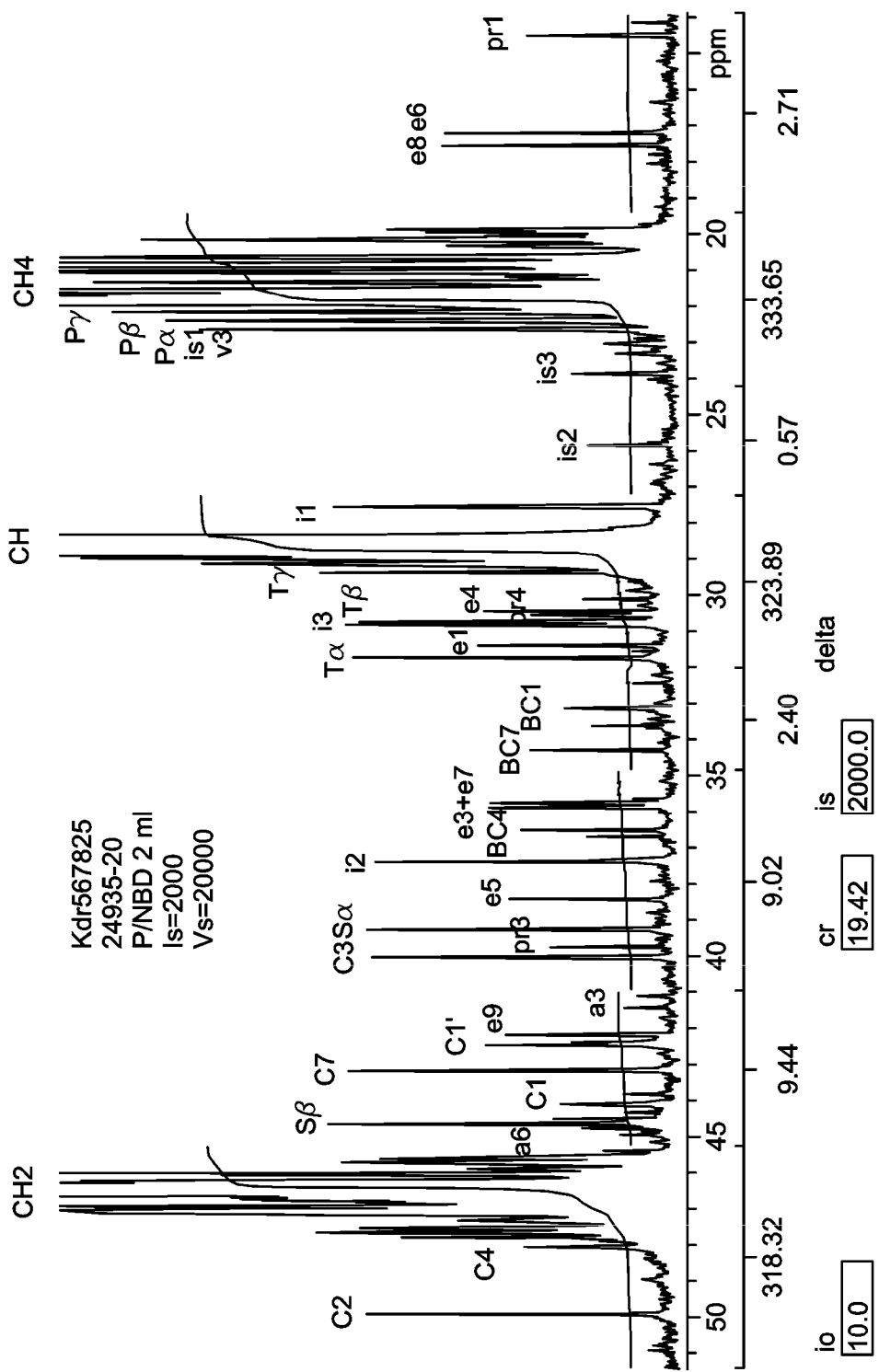
FIG. 1 is a labeled $^{13}$C NMR spectrum of the propylene/norbornadiene copolymer made according to Example 5.

As used herein the term "in-reactor polymer blend" is intended to mean a mixture of polymers produced in a plurality of polymerization stages without the need for post polymerization blending (although the resultant copolymer can undergo post polymerization blending, for example, to incorporate modifiers, additives, or additional blend components). Each polymer component in the mixture possesses a unique molecular structure such as percent comonomer content, composition distribution, molecular weight, molecular weight distribution, and molecular architecture such as branched block copolymers. Although the various polymerization stages will normally be conducted in different polymerization zones, that is in different reactors or different parts of the same reactor, the stages could be conducted sequentially in the same polymerization zone.

A polymerization zone is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

As used herein the term "branched block copolymer" is defined as the cross-product obtained when a first polymer chain (also referred as macromonomer) with reactive polymerizable groups is incorporated into a second polymer chain during the polymerization of the latter. With metallocene catalysts, reactive double bonds in the first polymer can be incorporated into the second polymer chains of the blend. These reactive double bonds can be vinyl groups on the chain ends or they can be the residual α olefin or norbornenyl double bonds of dienes that have been incorporated into the first polymer's chains. The resulting product comprises a backbone of the first of the polymer chains with branches of the second polymer chains extending from the backbone, wherein the backbone and branches possess different and unique molecular structures, such as molecular weight, chemical composition and crystallinity. Since the molecular structure/composition in the backbone and branches are different, the branched block composition has characteristics from both the backbone and the branches. For example, a branched block copolymer might have two glass transition temperatures, two melting points, and solubilities of individual blocks that are different. Branched block copolymers are also referred to as branched cross products.

The presence of branched block structures in the present in-reactor polymer blends can be detected using nuclear magnetic resonance spectroscopy (NMR). In $^{13}$C-NMR, the polymers are dissolved in tetrachloroethane-d2 at 140° C. and the spectra are collected at 125° C. Assignments of peaks for ethylene/propylene, ethylene/butene, ethylene/hexene, and ethylene/octene copolymers have been reviewed by James C. Randall in *Polymer Reviews* 29 (2), pp. 201-317, (1989). Assignments for propylene/butene, propylene/pentene, propylene/hexene, propylene/heptene, and propylene/octene are presented by U. M. Wahner, et. al. (*Macromol. Chem. Phys.* 2003, 204, 1738-1748). These assignments were made using hexamethyldisiloxane as the internal standard. To convert them to the same standard used in the other references and in FIG. 1, add 2.0 to the chemical shifts. Assignments and a method of measuring decene concentration have been reported for propylene/ethylene/decene terpolymers in Escher, Galland, and Ferreira (*J. Poly. Sci., Part A: Poly. Chem.*, 41, 2531-2541 (2003)) and Ferreira, Galland, Damiani, and Villar (*J. Poly. Sci, Part A: Poly. Chem*, 39, 2005-2018, (2001)). The peaks in the $^{13}$C-NMR spectrum of ethylene/norbornadiene copolymers are assigned by Monkkonen and Pakkanen (*Macromol. Chem. Phys.* 200, 2623-2628 (1999)) and Radhakrishnan and Sivaram (*Macromol. Chem. Phys.* 200, 858-862 (1999)).

In one embodiment, copolymers of propylene, ethylene, and α,ω-dienes are used in the synthesis of the in-reactor blends having cross-products, in which the α,ω-dienes have their double bonds inserted into polypropylene or propylene/ethylene copolymer chains. The numbers of α,ω-dienes inserted into each of these polymer backbones can be quantified in the $^{13}$C-NMR spectra using the assignments cited for ethylene/octene, propylene/octene, or propylene/ethylene/decene copolymers. The chemical shifts of the methines at the diene insertion sites, carbons adjacent to the methines on the backbones, and carbons α to the methines on the octene or decene will be unchanged when applied to copolymers containing $C_6$-$C_{12}$ α,ω-dienes, because the residual double bonds or second polymer chains at the ends of the α,ω-dienes are too far away (4 or more carbons) to change the shifts.

The following procedure can be used to calculate the diene branches per 10,000 carbons (B):

(a) Integrate the area under the vinyl allylic carbon peak at 33.91 ppm (V).

(b) Integrate the area of the aliphatic region (10-50 ppm) of the $^{13}$C-NMR spectrum (Ali). Do not include the area of the vinyl allylic peak.

(c) Calculate the total number of carbons in the spectrum, Tot, by summing the area of the aliphatic region and two times the area under vinyl allylic peak, i.e., Tot=Ali+2*V.

(d) Average the areas of the peaks assigned to the inserted ends of the α,ω-dienes to calculate the number of inserted diene ends (D).

(e) Estimate the number of diene branches, B, as 0.5*(D−V). This estimate is slightly low, because some of the vinyl groups in the allylic vinyl peak could have been from chain ends. However, typically, the number of residual vinyl groups in the dienes is much larger than those at the chain ends, because there are many dienes inserted per chain.

(f) To convert to diene-branches per 10,000 carbons, divide B by the total number of carbons, Tot, and multiply by 10,000.

In other embodiments, copolymers of propylene, ethylene, and norbornadiene are used to synthesize in-reactor blends with cross-products. The singly inserted norbornadienes can be quantified by integrating the peak for the bridging methylene, C7, at 42.7-43.5 ppm. When both double bonds have inserted, the bridging methylene is called BC7 and is found at 33.8-35.0 ppm. To calculate the norbornadiene branches per 10000 carbons, the area under the peak at 33.8-35.0 is multiplied by 10000 and divided by the total aliphatic area from 10-50 ppm. Because the bridging methylene is β to both of the double bonds of norbornadiene, it shifts after one double bond inserts and shifts again after the second double bond inserts. However, it is 4 carbons away from possible substituents at the β positions to the norbornene ring. These substituents produce very weak changes in the absorptions and these integration ranges can be used for all the norbornadiene-containing polymers described herein.

It is also possible that vinyl groups on the chain ends of polymers in both the first and second polymerizations can insert to make long chain branches. These long chain branches are of the "Y" type, where three chains meet at a single methine carbon. The peaks corresponding to methylenes adjacent to these branch points are found between 44 and 45 ppm. Assignments for long chain branches of iPP chains are discussed by Weng, Hu, Dekmezian, and Ruff (Macromolecules 2002, 35, 3838-3843). For propylene branches between propylenes in the backbone the methylenes are found at 44.88, 44.74, and 44.08 ppm. The methine of the branch is found at 31.84 ppm. For ethylene long chain branches in ethylene, Randall (*Polymer Reviews* 29 (2), pp. 201-317, (1989)) describes a method to measure them. In the polymers of this invention long chain branches between ethylene/propylene chains and isotactic polypropylene chains have been found at 44.68, 44.83, 44.92 ppm.

For in-reactor polymer blends with low content of branched block composition, the blends should be first fractionated using cyclohexane at room temperature. The amorphous or very low crystallinity copolymers that are not involved in cross products will be dissolved. The cross-products between polymers with different crystallinities will remain in the solids with the higher melting polymers of the in-reactor blend.

Long chain branching can also be observed by Small Amplitude Oscillatory Shear (SAOS) testing of the molten polymer performed on a dynamic (oscillatory) rheometer. From, the data generated by such a test it is possible to determine the phase or loss angle δ, which is the inverse tangent of the ratio of G" (the loss modulus) divided by G' (the storage modulus). For a typical linear polymer, the loss angle at low frequencies (or long times) approaches 90 degrees, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45 degrees. In contrast, a branched chain polymer relaxes very slowly, because the branches need to retract before the chain backbone can relax along its tube in the melt. This polymer never reaches a state where all its chains can relax during an oscillation, and the loss angle never reaches 90 degrees even at the lowest frequency, ω, of the experiments. The loss angle is also relatively independent of the frequency of the oscillations in the SAOS experiment; another indication that the chains cannot relax on these timescales.

In a plot of the phase angle δ versus the measurement frequency ω, polymers that have long chain branches exhibit a plateau in the function of δ(ω) whereas linear polymers do not have such a plateau. According to Garcia-Franco et al. (Macromolecules 2001, 34, No. 10, 3115-3117), the plateau in the aforementioned plot will shift to lower phase angles δ when the amount of long chain branching occurring in the polymer sample increases. Dividing the phase angle at which the plateau occurs by a phase angle of 90°, one obtains the critical relaxation exponent n which can then be used to calculate a gel stiffness using the equation:

$$\eta^*(\omega) = S\Gamma(1-n)\omega^{n-1}$$

wherein η* represents the complex viscosity (Pa*s), ω represents the frequency, S is the gel stiffness, Γ is the gamma function (see Beyer, W. H. Ed., CRC Handbook of Mathematical Sciences 5$^{th}$ Ed., CRC Press, Boca Rotan, 1978) and n is the critical relaxation exponent. Polymers produced herein preferably have a gel stiffness of more than 150 Pa*s, preferably at least 300 Pa*s and more preferably at least 500 Pa*s. The gel stiffness is determined at the test temperature of 190° C. A preferred relaxation exponent n for the polymers produced herein is less than 0.8 and more than 0. Generally, n will be between 0.1 and 0.7.

Small angle oscillatory shear data can be transformed into discrete relaxation spectra using the procedure on pages 273-275 in R. B. Bird, R. C. Armstrong, and O. Hassager, *Dynamics of Polymeric Liquids, Volume 1, Fluid Mechanics*, 2$^{nd}$ Edition, John Wiley and Sons, (1987). The storage and loss moduli are simultaneously least squares fit with the functions:

$$G'(\omega_j) = \Sigma \eta_k \lambda_k \omega_j^2 / (1 + (\eta_k \omega_k)^2)$$

$$G''(\omega_j) = \Sigma \eta_k \omega_j / (1 + (\eta_k \omega_k)^2)$$

at the relaxation times $\lambda_k$=0.01, 0.1, 1, 10, and 100 seconds. The sums are from k=1 to k=5. The sum of the $\eta_k$'s is equal to the zero shear viscosity, $\eta_0$. An indication of high levels of cross-products is a high value of $\eta_5$, corresponding to the relaxation time of 100 seconds, relative to the zero shear viscosity. The viscosity fraction of the 100 second relaxation time is $\eta_5$ divided by the zero shear viscosity, $\eta_0$. For the present polymers the viscosity fraction of the 100 second relaxation time is preferably at least 0.25, more preferably at least 0.4, and most preferably at least 0.8.

The term secant slope, as used herein, is measured using plots of the logarithm (base ten) of the dynamic viscosity versus logarithm (base ten) of the frequency. The secant slope is the difference in the log(dynamic viscosity) at a frequency of 100 s$^{-1}$ and the log(dynamic viscosity) at a frequency of 0.01 s$^{-1}$ divided by log(100)–log(0.01). These plots are the typical output of small angle oscillatory shear (SAOS) experiments. For ethylene/propylene copolymers, a conventional SAOS test temperature is 190° C. Polymer viscosity is conveniently measured in poise (dyne-second/square centimeter) at shear rates within a range of from 0 radian per second (rad/sec) to 100 rad/sec and at 190° C. under a nitrogen atmosphere using a dynamic mechanical spectrometer, such as the Advanced Rheometrics Expansion System (ARES). Generally a high negative value for secant slope indicates a polymer is highly shear-thinning and that it is readily processable in high shear processes, for example by injection molding. For the present in-reactor blends, the secant slope is generally less than –0.25.

The term "strain hardening index" (SHI), as used herein, is the ratio of the stress at break divided by the yield stress in a stress-strain curve. Stress-strain curves were carried out at room temperature using a mechanical testing machine from the MTS Company. Generally, at least five replicate runs were averaged. The test samples were compression molded to a thickness of 0.055+/–0.002 inches (1.4+/–0.05 mm) and were cut to a width of 0.125 inches (3.18 mm). For these samples the microtensile mold was used to cut the samples. Young's modulus was measured by fitting a tangent straight line to the initial part of the stress-strain curves, starting at a strain of 0.0. Yield stresses were calculated by fitting straight lines to the curves in the range of strains from 0.5 to 1.0 and then extrapolating back to a strain of 0.0. For these samples the stress at break was taken as the maximum stress observed before breaking. The strain at break was the strain where the samples broke.

Polymer Blend

In a first embodiment, the in-reactor polymer blend described herein comprises at least 60 mole %, preferably at least 80 mole %, of propylene and from 0.01 to 10 mole % of one or more dienes selected from the group consisting of $C_6$ to $C_{12}$ α,ω-diene, norbornadiene, vinyl norbornene and mixtures thereof, with the balance being ethylene. Typically the ethylene content of the blend is between about 5 and about 35 mole %, such as between about 5 and 15 mole %, of the blend. The blend comprises at least first and second polymers having different crystallinities, together with cross-products in which one or more chains of the first polymer are connected to the second polymer by way of a diene bridge. According to $^{13}$C-NMR, there are one or more doubly inserted dienes per 10000 carbons.

In the first embodiment, the first polymer is conveniently a propylene/ethylene/diene terpolymer comprising between about 5 mole % and about 95 mole %, such as between about 40 mole % and about 60 mole %, propylene; between about 0.01 mole % and about 10 mole % diene, such as about 2 mole % diene, and between about 94.99 mole % and about 50 mole %, such as between about 58 mole % and about 38 mole %, ethylene. Particularly useful terpolymers are amorphous or have a crystallinity of less than 20%, alternately less than 10%, generally less than 5% as determined by differential scanning calorimetry (DSC).

In the first embodiment, the second polymer is conveniently a propylene homopolymer, such as isotactic, highly isotactic, or highly syndiotactic polypropylene. As used herein, "isotactic" is defined as having at least 20% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C NMR.

Particularly useful propylene homopolymers have a crystallinity of at least 20%, generally at least 30% as determined by differential scanning calorimetry (DSC) as described in the Examples. Heat of fusion is another measure of crystallinity and useful propylene homopolymers typically have a heat of fusion greater than 30 J/g, generally greater than 50 J/g, as determined by DSC analysis. Suitable propylene homopolymers typically have a melting temperature of at least 130° C., generally at least 145° C.

Useful propylene homopolymers normally have a weight averaged molecular weight of at least 60,000 g/mol, such as at least 80,000 g/mol, alternately from 60,000 to 1,000,000 g/mol.

Alternatively, in the first embodiment, the first polymer is a propylene homopolymer, such as isotactic, highly isotactic, or highly syndiotactic polypropylene, and the second polymer is a propylene/ethylene copolymer such as that described above.

In a further alternative, the first polymer is a propylene/ethylene copolymer with a first ethylene content and said second polymer is a propylene/ethylene copolymer with second, higher ethylene content. Alternatively, the first polymer is a propylene/ethylene copolymer with a first ethylene content and said second polymer is propylene/ethylene copolymer with a second, lower ethylene content.

In a second embodiment, the in-reactor polymer blend described herein comprises at least 80 mole % of ethylene and from 0.01 to 10 mole % of at least one diene selected from the group consisting of norbornadiene, vinyl norbornene, $C_6$ to $C_{12}$ $\alpha,\omega$-dienes, and mixtures thereof with the balance being an alpha-olefin selected from the group consisting of propylene, butene, pentene, hexene, and mixtures thereof wherein the blend comprises first and second polymers having different crystallinities in which at least the second polymer comprises at least one branch of the first polymer having 8 or more carbon atoms per 10,000 carbon atoms as observed by $^{13}$C NMR.

The diene component employed in the present in-reactor polymer blends can be a straight chain diene, such as 1,7-octadiene or 1,9-decadiene, or can be a cyclic diene, such as vinyl norbornene or norbornadiene. One particularly useful diene is norbornadiene because both of its double bonds are more reactive with metallocenes than $\alpha$-olefins. Thus, norbornadiene is easy to incorporate into the polymer of the first reaction and the incorporated reactive site is also more reactive than propylene in the second reaction, leading to much higher concentrations of cross-products. Actually, the norbornadienes incorporated in the first reaction are so reactive, that they partially react in the first reaction to make long chain branches instead of cross-products. This side reaction is desirable, since long chain branched polyolefins have many useful attributes.

The present in-reactor polymer blend also contains a distribution of cross-products formed principally from the grafting of the first polymer onto the second polymer backbone through the intermediary of the diene. These hybrid cross-products, also known as branch-block copolymers, form when reactive double bonds from the first polymerization participate in the polymerization of the second polymer. The presence of branch-block copolymers is believed to influence the events occurring during the polymerization as well as product properties. The extent of influence depends on the population distribution of the branch-block cross products. In general the population of cross-products in the present in-reactor polymer blend is such that at least one diene branch per 10,000 carbon atoms is observed in the $^{13}$C NMR.

When the present in-reactor polymer blend is subjected to Differential Scanning Calorimetry as described in the Examples, the second heating cycle normally generates at least two peaks corresponding respectively to a first melting point of at least 70° C., normally at least 130° C. and typically at least 135° C. and a second melting point of at least 40° C. such that the difference between the first and second melting temperatures is at least 20° C. In addition, the blend generally exhibits a first glass transition temperature, Tg, of 20° C. or less and second Tg at least 20° C. different, normally less, than the first Tg, again as determined by Differential Scanning Calorimetry. Typically, the second Tg is less than 0° C.

When the present in-reactor polymer blend is subjected to Differential Scanning Calorimetry as described in the Examples, the second heating cycle can have a one or two melting points and one or two glass transitions depending on the embodiment of the invention. One embodiment of the invention is in-reactor blends of propylene copolymers. These have highest melting points of at least 120° C., normally at least 130° C. and typically at least 135° C. The glass transitions are much lower than a typical isotactic polypropylene and the lowest glass transition is less than –20° C. Multiple melting peaks occur when both copolymers of the in-reactor blend are semi-crystalline. In another embodiment of the invention, the DSCs are of in-reactor blends of ethylene copolymers. The first melting point is at least 70° C. and the first glass transition temperature is less than 20° C. A second melting temperature at least 20° C. different than the first melting temperature or a second Tg at least 20° C. different than the first Tg are present in the in-reactor blends of this embodiment.

The present in-reactor polymer blend has a viscosity average branching index g' of less than 0.9, generally less than 0.8. Branching index values employed herein are measured using Size Exclusion Chromatography (SEC) with differential refractive index, light scattering, and viscometer detectors (SEC-DRI-LS-VIS). The branching index g' is defined as:

$$g' = \frac{\eta_b}{\eta_l}$$

where $\eta_b$ is the average intrinsic viscosity of the branched polymer and $\eta_l$ is the intrinsic viscosity of a linear polymer of the same viscosity-averaged molecular weight ($M_v$) as the branched polymer. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison are normally of the same viscosity average molecular weight, monomer content and composition distribution. However, at every molecular linear polyethylene and linear propylene/ethylene copolymers have larger intrinsic viscosities than linear polypropylene. If linear polypropylene is used to calculate the h1, then linear and even weakly branched reactor blends will have a g' greater than or equal to one. When g' is less than one, high concentrations of the long chain branched, cross products must be present. In the averages, the intrinsic viscosity of a linear polypropylene is $KM_i^\alpha$, where K=0.0002288 and α=0.705. The viscosity averaged g' was calculated using the following equation:

$$g'_{vis} = \frac{\sum C_i[\eta_i]_b}{\sum C_i KM_i^\alpha}$$

where $C_i$ is the polymer concentration in the slice i in the polymer peak, and $[\eta_i]_b$ is the viscosity of the in-reactor blend in slice i of the polymer peak, and $M_i$ is the weight averaged molecular weight in slice i of the polymer peak measured by light scattering, K and α are the parameters for linear polypropylene.

The presence of cross-products is also qualitatively evident in the molecular weight distributions measured by the SEC-DRI-LS-VIS experiment. In general the molecular weight distribution of the polymer made in the first polymerization zone will be different than the molecular weight distribution in the second zone, because catalysts, monomer concentrations, temperatures, and pressures can be different. It is expected that two peaks or a peak and a shoulder may be present in the chromatograms of in-reactor blends depending on the average molecular weights of each polymer. However, if high levels of cross-products are made through the diene bridges, a third peak is often visible at higher molecular weights or shorter retention times. In some of the Examples the molecular weight peaks due to the first and second polymers are small and the major peak is the high molecular weight peak due to the cross-products.

Another important property of the present in-reactor blends is long relaxation times. One way to quantify these long relaxation times is to calculate the viscosity fraction of chains with relaxation times of 100 seconds, using the method cited earlier. In particular, the viscosity fraction of chains with relaxation times of 100 seconds in the present in-reactor blend is at least 0.25 and typically about 0.5 up to 1.0. In contrast, viscosity fractions of chains with relaxation times of 100 seconds in conventional isotactic polypropylene and conventional propylene/ethylene copolymers are of the order of 0.10 or less.

In addition, at least 90 wt %, such as at least 95 wt %, and normally 100 wt %, of the present in-reactor polymer blends are typically soluble in refluxing xylenes at 138° C. indicating that the blends are substantially free of gel due to cross-linking.

Process for Producing the Polymer Blend

The in-reactor polymer blend of the first embodiment may be produced by initially contacting a first monomer composition comprising propylene, from 0.01 to 10 mole % of one or more dienes selected from the group consisting of $C_6$ to $C_{12}$ α,ω-dienes, norbornadiene, vinyl norbornene and mixtures thereof and optionally ethylene in a first polymerization stage with a metallocene first catalyst which is capable of polymerizing said first monomer composition to produce a first polymer and which is also capable of incorporating the diene into the first polymer such that the product of the first polymerization stage is a propylene-containing first polymer comprising at least 0.01% olefinic unsaturation from said diene.

At least part of the contents of the first reaction stage are then subjected to a second polymerization stage together with a second monomer composition comprising propylene and optionally ethylene using a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition and wherein the partial pressure of said second monomer composition is kept below 1000 kPa, such as from about 250 to about 1000 kPa, during said second polymerization stage when the reactor is partially filled with liquid reaction medium during polymerization.

The second catalyst is normally also a metallocene catalyst and in one embodiment, the second reaction stage employs the same catalyst system as the first reaction stage, with no additional catalyst being supplied to the second reaction stage. Alternatively, an additional amount of the same catalyst system as used in the first reaction stage can be fed to the second reaction stage. Generally between about 10% and about 90%, such as between about 20% and about 80%, for example between about 30% and about 70% of the total catalyst is supplied to the first reaction stage, with the remainder being supplied to the second reaction stage. The molar ratio of the catalyst supplied to the first reaction stage to the catalyst supplied to the second reaction stage depends on the end-use requirements of the in-reactor polymer blend.

In another embodiment, the catalyst system includes a first polymerization catalyst which is capable of producing crystalline polypropylene and which is fed to the first reaction stage, and a second polymerization catalyst which is different from the first catalyst, is capable of producing amorphous poly-alpha-olefins and is fed to the second reaction stage. The molar ratio of the first polymerization catalyst to the second polymerization catalyst is generally from 5:95 to 95:5 depending on the application and other process variables. The resultant intimate mixing among the different components of the in-reactor produced polymer blend provides excellent interface bonding and enhanced mechanical properties.

Alternatively, the polymerization catalyst capable of producing amorphous poly-alpha-olefins is fed to the first reaction stage and the polymerization catalyst capable of producing crystalline polypropylene is fed to the second reaction stage.

Typically, the catalyst employed to produce the second polymer component is compatible with, the catalyst used to produce the first polymer component. In such a case, the first and second polymerization stages can be conducted sequentially in the same reaction zone or can be affected in separate zones of a multiple-zone reactor, or in separate, series-connected reactors, with the entire effluent from the first polymerization zone, including any active catalyst, being transferred to the second polymerization zone. Additional catalyst can then be added, as necessary to the second polymerization stage. In one embodiment, the present process is conducted in two or more series-connected, continuous flow, stirred tank or tubular reactors using metallocene catalysts.

As described above, the contents of the first reactor stage can be transferred to the second reactor stage, and become a part of the reaction medium in the second reactor stage. The catalyst system employed in the first reactor stage is still active to continue the polymerization reaction in the second reactor stage. Alternatively, a part or all of the solvent and unreacted monomers are removed from the polymerization effluent in the first reactor stage, and the polymer, and remaining solvent and monomers are transferred into the second reactor stage. This can be implemented in a system with two reactors in series and a primary separator in between the two reactors. This process scheme also allows independent control of polymerization temperature in the first and second polymerization stages.

The in-reactor polymer blend of the second embodiment may be produced by initially contacting a first monomer composition comprising ethylene, from 0.01 to 10 mole % of one or more dienes selected from the group consisting of $C_6$ to $C_{12}$ α,ω-dienes, norbornadiene, vinylnorbornene, and mixtures thereof and optionally propylene, butene, pentene hexene or mixtures thereof in a first polymerization stage with a metallocene first catalyst which is capable of polymerizing said first monomer composition to produce a first polymer and which is also capable of incorporating the diene into the first polymer such that the product of the first polymerization stage is an ethylene-containing first polymer comprising more than one olefinic unsaturation per chain and from 0.1 to 10 mole % diene. The first polymerization stage may be conducted in the presence of hydrogen. After the first polymerization stage, at least part of the first polymer is contacted with a second monomer composition comprising propylene and optionally ethylene in a second polymerization stage with a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition.

It is to be appreciated that, although the foregoing discussion refers only to first and second polymerization stages, further reaction stages could be employed, with the feed to the second reaction stage being split between the additional reaction stages. However, from an economic viewpoint, such additional reaction stages are not currently preferred.

Polymers with bimodal distributions of molecular weight and composition can be produced by the present polymerization process by, for example, controlling the polymerization conditions in the first and the second polymerization stages and/or by selecting the catalysts for the first and the second polymerizations, such as by using multiple catalysts in each polymerization stage. Bimodal distributions of molecular weight and composition of the second polymer can also be obtained when different catalysts are used in the first and second polymerization stages and the catalyst employed in the first polymerization stage is transferred into the second polymerization stage for production of the branched block polymers.

In an alternative embodiment, the first step of polymerization is replaced by the use of a pre-made first polymer containing olefinic unsaturation from partial polymerization of one or more dienes selected from the group of $C_6$ to $C_{12}$ α,ω-dienes, norbornadiene, vinyl norbornene and mixtures thereof. The pre-made polymer can be produced in a separate system and/or a separate location and fed to the second polymerization step as a solution in a solvent, such as toluene. The pre-made first polymer could also be ground into fine powder and then added into the reaction medium for the second polymerization step.

Any known polymerization process may be used to produce the present polymer blend. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous process is meant that there is continuous addition to, and withdrawal of reactants and products from, the reactor system. Continuous processes can be operated in steady state, i.e., the composition of effluent remains fixed with time if the flow rate, temperature/pressure and feed composition remain invariant. For example a continuous process to produce a polymer would be one where the reactants are continuously introduced into one or more reactors and polymer product is continuously withdrawn.

Preferably, the polymerization is conducted in a continuous, stirred tank reactor. Tubular reactors equipped with the hardware to introduce feeds, catalysts and scavengers in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutane, mixed butanes, hexane, pentane, isopentane, isohexane, cyclohexane, isooctane, and octane. In an alternate embodiment a perfluorocarbon or hydrofluorocarbon is used as the solvent or diluent.

In one embodiment, the first polymerization stage is conducted by slurry polymerization and the second polymerization stage is conducted by a continuous solution process.

The polymerization process conditions are generally selected to promote the production of reactive macromonomers in the first polymerization step and the incorporation of side branches into the backbone in the second polymerization step. For some metallocene catalysts, high polymerization temperatures in the first polymerization step enhance the population of reactive macromonomer polypropylenes.

The residual double bonds of the dienes incorporated in the first polymerization step are so reactive that some of them may participate in the first polymerization reaction before the first chains are discharged into the second polymerization zone. These doubly inserted dienes lead to long chained branched polymers in the first zone. This long chain branching is often desirable, because the polymers have improved processability and melt strengths. However, it may be controlled by lowering the diene concentrations, by increasing the total monomer pressure in the first zone, or by adding $H_2$ or other chain transfer agents to lower the molecular weights of the polymers synthesized in the first polymerization zone. Increasing the total monomer pressure in the first polymerization zone, makes the relative concentrations of dienes lower and a lower mole fraction of dienes will incorporate. Higher total monomer concentrations also increases the molecular weights of the chains in the first polymerization zone. However, since the incorporated dienes are the targets for incorporation in the second polymerization zone instead of the vinyl groups on the chain ends, the second polymerizations are not significantly affected by the addition of $H_2$ or other chain transfer agents to reduce molecular weights. This is one major advantage for the diene copolymers over the vinyl-terminated macromonomers reported earlier in the literature. Since the number of dienes incorporated per chain depends on the molecular weight or length of the chains, the addition of $H_2$ or chain transfer agents also affects the number of sites per chain available to form diene bridges or cross products in the second polymerization zone.

The reactive chains from the first polymerization zone also need to be soluble in the reaction medium in the second polymerization step so that they can re-incorporate into growing chains when a solution process is employed. Adequate mixing is also important in the second polymerization step to ensure proper contact of the first polymer chains with the growing backbone molecules. To promote incorporation of the residual double bonds of the first polymer chains over monomer insertion in the second polymerization stage, the partial pressure of said second monomer composition is kept below 1000 kPa during said second polymerization stage. The lower the partial pressure of the second monomer composition, the lower the concentration of monomers is at the active site of the second catalyst and the lower the rate of their insertion is relative to insertion of the residual double bonds in the first polymers. To get the highest levels of cross products, the second polymerization should be carried out at less than 200 kPa.

Suitable conditions for polymerization in each reaction stage include a temperature from about 50 to about 250° C., such as from about 50 to about 150° C., for example from about 70 to about 150° C. and a pressure of 0.1 MPa or more, such as 2 MPa or more. The upper pressure limit is not critically constrained but is typically 200 MPa or less, such as 120 MPa or less, except when operating in supercritical phase then the pressure and temperature are above the critical point of the reaction media in question (typically over 95° C. and 4.6 MPa for propylene polymerizations). For more information on running supercritical polymerizations, see International Patent Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

Generally the temperature employed in the second reaction zone is higher than the temperature employed in the first reaction zone, typically by at least 10° C., such as at least 20° C. In one embodiment, the temperature employed in the first reaction zone is between about 55° C. and about 70° C. and the temperature employed in the second reaction zone is between about 70° C. and about 100° C. Higher temperatures in the second reaction zone have the advantage of keeping the first polymers in solution and capturing some of the heat of polymerization from the first reaction zone. This use of the polymerization medium as a heat sink for the first reaction zone allows slightly higher loading of the first reaction zone.

A polymer can be recovered from the effluent of either the first polymerization step or the second polymerization step by separating the polymer from other constituents of the effluent using conventional separation means. For example, polymer can be recovered from either effluent by coagulation with a non-solvent, such as methanol, isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream in the polymer recovery processes. Deactivation may be effected by the mixing with suitable polar substances such as water, whose residual effect following recycle can be counteracted by suitable sieves or scavenging systems.

The catalyst employed in the first reaction stage should be able to incorporating the diene into the first polymer without gel production, while the catalyst used in the second reaction stage should be capable of incorporating the polymerizable macromonomer into a growing chain of the second polymer to form branched block polymers. The catalysts can be in the form of a homogeneous solution, supported, or a combination thereof. A wide variety of transition metals compounds are known that, when activated with a suitable activator, will polymerize alpha-olefins selectively to produce either crystalline polymers or amorphous polymers. For a full discussion of such compounds reference is directed to International Patent Publication No. WO 2004/046214, published Jun. 3, 2004, the entire contents of which are incorporated herein by reference.

Preferably, the first polymer is made with an activated metallocene catalyst which forms essentially or substantially isotactic propylene sequences, whereas the second polymer is made with an activated metallocene catalyst which forms amorphous polymers.

Suitable metallocene catalysts capable of producing crystalline poly-alpha-olefins, such as crystalline propylene homopolymers, include those obeying the following general

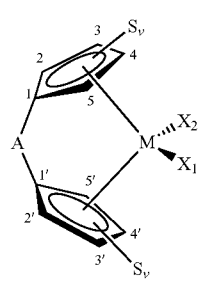

Formula (1)

wherein
M is a Group 3, 4, 5 or 6 transition metal atom, or a lanthanide metal atom, or actinide metal atom, preferably a Group 4 transition metal atom selected from titanium, zirconium or hafnium; each cyclopentadienyl (Cp) ring is substituted with from zero to four substituent groups $S_v$, each substituent group $S_v$ being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent $S_v$ groups may be joined to form a $C_4$ to $C_{20}$ ring to give a saturated or unsaturated polycyclic ligand, wherein the subscript "v" denotes the carbon atom on the Cp-ring to which the substituent is bonded; A is a bridging group; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring, preferably $X_1$ and $X_2$ are halogen or hydrocarbyl radicals, such as chloride, bromide, methyl, ethyl, propyl, or butyl).

Conveniently, A is a bridging group containing boron or a Group 14, 15 or 16 element. Examples of suitable bridging groups include R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R' C=CR', R' C=CR' CR'$_2$, R'$_2$CCR'=CR' CR'$_2$, R'C=CR'CR'=CR', R'C=CR'CR'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R' C=CR' SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'N, R'P, O, S, Se, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group Y include $CH_2$, $CH_2CH_2$, $C(CH_3)_2$, O, S, $SiMe_2$, $SiPh_2$, $SiMePh$, $Si(CH_2)_3$ and $Si(CH_2)_4$.

Preferred transition metal compounds for producing poly-alpha-olefins having enhanced isotactic character are those of formula 1 where the $S_\nu$ groups are independently chosen such that the metallocene framework 1) has no plane of symmetry containing the metal center, and 2) has a $C_2$-axis of symmetry through the metal center. These complexes, such as rac-$Me_2Si(indenyl)_2ZrMe_2$ and rac-$Me_2Si(indenyl)_2HfMe_2$, are well known in the art and generally produce isotactic polymers with high degrees of stereoregularity. Similarly another preferred class of transition metal compounds that can produce isotactic polymers useful herein are the monocyclopentadienyl catalysts disclosed in U.S. Pat. No. 5,026,798, which is incorporated by reference herein. A detailed description of suitable catalyst compounds and catalyst selections may be found in US Published Patent Application No. 2004/0217614, published Jul. 1, 2004, which is incorporated by reference herein.

Similarly, transition metal compounds providing tacticity control exist where the $S_\nu$ substituents of sufficient steric bulk to restrict rotation of the cyclopentadienyl ligands such that the aforementioned symmetry conditions are satisfied. Preferable chiral racemic metallocenes of this type include bis(tricyclo[5.2.1.0$^{2,6}$]deca-2,5-dienyl)zirconium and -hafnium dimethyl, bis((1R)-9,9-dimethyltricyclo[6.1.1.0$^{2,6}$]deca-2,5-dienyl)zirconium dimethyl, bis(tricyclo[5.2.1.0$^{2,6}$]deca-2,5,8-trienyl)zirconium dimethyl, bis(tricyclo[5.2.2.0$^{2,6}$]undeca-2,5,8-trienyl)zirconium and hafnium dimethyl and bis((1R,8R)-7,7,9,9-tetramethyl[6.1.1.0$^{2,6}$]deca-2,5-dienyl)zirconium and hafnium dimethyl.

Particularly preferred transition metal compounds for producing crystalline poly-alpha-olefins are racemic metallocenes, such as rac-dimethylsiladiyl(2-isopropyl,4-phenylindenyl)$_2$zirconium dichloride; rac-dimethylsiladiyl(2-isopropyl,4-[1-naphthyl]indenyl)$_2$zirconium dichloride; rac-dimethylsiladiyl(2-isopropyl,4-[3,5-dimethylphenyl]indenyl)$_2$zirconium dichloride; rac-dimethylsiladiyl(2-isopropyl,4-[ortho-methyl-phenyl]indenyl)$_2$zirconium dichloride; rac-dimethylsilyl bis-(2-methyl, 4-phenylindenyl)zirconium dichloride, rac-dimethylsiladlyl bis-(2-methyl, 4-naphthylindenyl)zirconium dichloride, rac-dimethyl siladiyl(2-isopropyl, 4-[3,5 di-t-butyl-phenyl]indenyl)$_2$zirconium dichloride; rac-dimethyl siladiyl(2-isopropyl, 4-[orthophenyl-phenyl]indenyl)$_2$zirconium dichloride, rac-diphenylsiladiyl(2-methyl-4-[1-naphthyl]indenyl)$_2$zirconium dichloride and rac-biphenyl siladiyl(2-isopropyl, 4-[3,5 di-t-butyl-phenyl]indenyl)$_2$zirconium dichloride. Alkylated variants of these metallocenes (e.g. di-methyl instead of dichloride) are also contemplated, dictated by the choice of catalyst activation system. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

Suitable transition metal compounds for the production of poly-alpha-olefins having enhanced syndiotactic character are those of formula 1 where the $S_\nu$ substituents are independently chosen such that the Cp ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the A and E ligands that renders each to be symmetrical with respect to the Y bridging group but different with respect to each other thereby controlling the approach of each successive monomer unit that is added to the polymer chain. The steric difference between the A and E ligands act to block the approaching monomer from a random approach such that the monomer is added to the polymer chain in the syndiotactic configuration.

Preferable transition metal compounds for the production of syndiotactic polymers are those of formula 1 where the $S_\nu$ substituents are independently chosen such that 1) the steric difference between the A and E ligands is maximized and 2) there remains a plane of symmetry through the metal center and the $C_1$ and $C_{1'}$ carbon atoms of the Cp-rings in formula 1. Thus, complexes such as $Me_2C(\eta^5-C_5H_4)(1$-fluorenyl)$MMe_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5,10,10,11,11-octahydrodibenzo[b,h]fluorene. Because pre-catalysts of this type often lose their ability to control the stereoregularity of the polymer under high temperature reaction conditions, to insure higher crystallinity in the material requires using these catalysts at lower reactor temperatures, preferably at temperatures below 80° C.

Suitable transition metal compounds for producing the amorphous second polymer component of the in-reactor blend are mono-cyclopentadienyl transition metal compounds obeying the formula (2):

Formula (2)

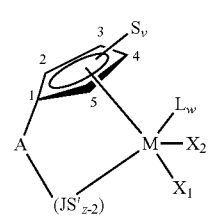

wherein M is a Group 3, 4, 5 or 6 transition metal atom, or a lanthanide metal atom, or actinide metal atom, preferably a Group 4 transition metal atom selected from titanium, zirconium or hafnium; $S_\nu$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); (JS'$_{z-2}$) is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J; A is a bridging group as defined above; $X_1$ and $X_2$ are the same as in formula 1; L is an olefin, diolefin, aryne, amine, phosphine, ether, or sulfide ligand, or any other neutral Lewis base; provided L can also be a second transition metal compound of the same type such that the two metal centers M and M* are bridged by $X_1$ and $X'_1$, wherein M* has the same meaning as M, $X'_1$ has the same meaning as $X_1$, and w is an integer from 0 to 3.

"Symmetrically substituted" in relation to the S ligands in formula (2) is defined to mean that the cyclopentadienyl ring is substituted in the 2 and 5 positions and/or 3 and 4 positions with $S_v$ groups that are of approximately of the same steric bulk. Typically the size of these $S_v$ groups is within 2 carbons of each other. Thus, a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs is of similar steric bulk. Additionally, two adjacent $S_v$ groups in the 3 and 4 position may be linked to form a ring provided that the new ring is also symmetrically substituted.

Catalyst systems including transition metal compounds of the type defined by formula (2) are known to impart 2,1-mistakes when incorporating C3 and higher alpha-olefins. The compounds where S' is bonded to a nitrogen ligand (J) via a tertiary carbon (for example when S' is tert-butyl or 1-adamantyl) have fewer 2,1-mistakes then when S' is bonded to the nitrogen ligand (J) via a primary carbon (for example when S' is n-butyl, methyl, or benzyl) or secondary carbon (for example when S' is cyclododecyl, cyclohexyl, or sec-butyl). The 2,1-mistakes in the polymer backbone impart $(CH_2)_2$ units that can be beneficial to the polymer properties. Polymers of this type, the characterization of such polymers and the catalyst systems used to produce such polymers are described in U.S. Pat. No. 5,723,560, which is incorporated herein by reference. Lower Mw versions of such polymers can be produced by changing process condition, for example, by increasing reactor temperature.

Illustrative, but not limiting examples of preferred mono-cyclopentadienyl metallocenes of the type described in formula (2) above are:

μ-$(CH_3)_2$Si(cyclopentadienyl)(1-adamantylamido)M(R)$_2$
μ-$(CH_3)_2$Si(3-tertbutylcyclopentadienyl)(1-adamantylamido)M(R)$_2$
μ-$(CH_3)_2$Si(tetramethylcyclopentadienyl)(1-adamantylamido)M(R)$_2$
μ-$(CH_3)_2$C(tetramethylcyclopentadienyl)(1-adamantylamido)M(R)$_2$
μ-$(CH_3)_2$Si(tetramethylcyclopentadienyl)(1-tertbutylamido)M(R)$_2$
μ-$(CH_3)_2$Si(fluorenyl)(1-tertbutylamido)M(R)$_2$
μ-$(CH_3)_2$Si(tetramethylcyclopentadienyl)(1-cyclododecylamido)M(R)$_2$
μ-$(CH_3)_2$C(tetramethylcyclopentadienyl)(1-cyclododecylamido)M(R)$_2$ wherein M is selected from a group consisting of Ti, Zr, and Hf and wherein R is selected from Cl and $CH_3$.

Additionally, some catalysts that produce syndiotactic poly-alpha-olefin at lower temperatures, will produce virtually non-crystalline poly-alpha-olefins at higher temperatures. Preferred transition metal compounds of this type are illustrated in formula (3):

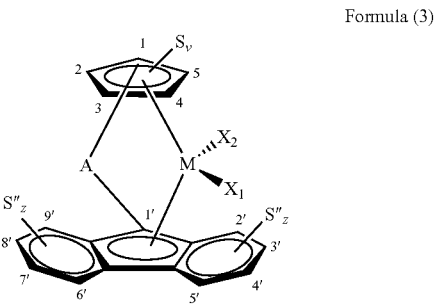

Formula (3)

wherein M is a Group 3, 4, 5 or 6 transition metal atom, or a lanthanide metal atom, or actinide metal atom, particularly a Group 4 transition metal atom selected from titanium, zirconium or hafnium; $S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$ to $C_{20}$ ring to give a saturated or unsaturated polycyclic ligand; subscript "z" denotes the carbon atom on the fluorenyl ring to which the substituent is bonded and where there can be zero to seven substituents, S", on the fluorenyl ring; and A is a bridging group as defined above, $X_1$ and $X_2$ are as defined above.

"Symmetrically substituted" in relation to the $S_v$ ligands in formula (3) is defined to mean that the cyclopentadienyl ring is substituted in the 2 and 5 positions and/or 3 and 4 positions with $S_v$ groups that are of approximately of the same steric bulk. Typically the sizes of these $S_v$ groups are within 2 carbons of each other. Thus, a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs are of similar steric bulk. Additionally, two adjacent $S_v$ groups in the 3 and 4 position may be linked to form a ring provided that the new ring is also symmetrically substituted.

Preferably metallocene precursors for producing poly-alpha-olefins having largely amorphous character (when used as catalysts under higher reactor temperature conditions) are those of formula (3) where $S_v$ are independently chosen such that the metallocene framework has a plane of symmetry containing the metal center and bisecting the Flu- and Cp-rings. The A ligand need not be symmetrical—for example dimethylsilyl or methylphenylsilyl will not affect the stereochemistry of the polymer produced. Because of the distant placement of the S" substituents on the fluorenyl ring, these substituents need not be symmetrically placed on the fluorenyl ring. Hence, the fluorenyl ring may be substituted with up to 7 substituents that may be the same or different.

Illustrative, but not limiting examples of preferred unsymmetrical cyclopentadienyl metallocenes of the type described in formula (3) above for the invention are:

μ-(C$_6$H$_5$)$_2$C(cyclopentadienyl)(fluorenyl)M(R)$_2$
μ-(C$_6$H$_5$)$_2$C(3-methylcyclopentadienyl)(fluorenyl)M(R)$_2$
μ-(CH$_3$)$_2$C(cyclopentadienyl)(fluorenyl)M(R)$_2$
μ-(C$_6$H$_5$)$_2$C(cyclopentadienyl)(2-methylindenyl)M(CH$_3$)$_2$
μ-(C$_6$H$_5$)$_2$C(3-methylcyclopentadienyl)(2-methylindenyl)M(Cl)$_2$
μ-(p-triethylsilylphenyl)$_2$C(cyclopentadienyl)(3,8-di-t-butylfluorenyl)M(R)$_2$
μ-(C$_6$H$_5$)$_2$C(cyclopentadienyl)(2,7-dimethylindenyl)M(R)$_2$
μ-(CH$_3$)$_2$C(cyclopentadienyl)(2,7-dimethylindenyl)M(R)$_2$ wherein M is chosen from the group consisting of Zr and Hf and R is chosen from the group consisting of Cl and CH$_3$.

Additionally, compounds of formula (4) may be used to produce the amorphous polymer component:

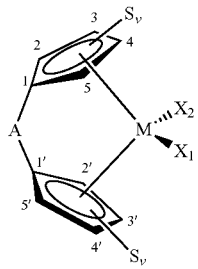

Formula (4)

wherein M is a Group 3, 4, 5 or 6 transition metal atom, or a lanthanide metal atom, or actinide metal atom, preferably a Group 4 transition metal atom selected from titanium, zirconium or hafnium; S$_v$ is the same as in formula 1 where the subscript "v" denotes the carbon atom on each cyclopentadienyl ring to which the substituent is bonded and where there can be zero to four substituents, S$_v$, on each cyclopentadienyl ring provided that the cyclopentadienyl rings are symmetrically substituted (as defined below); and A, X$_1$ and X$_2$ are the same as defined in formula 1.

"Symmetrically substituted" in relation to the S$_v$ ligands in formula (4) is defined to mean that the metallocene framework has a plane of symmetry that bisects M and A. Thus, where the cyclopentadienyl rings include substituents, they should be substituted in the 2 and 2' positions and/or 3 and 3' positions and/or 4 and 4' positions and/or 5 and 5' positions with S groups that are of approximately of the same steric bulk. Typically the sizes of these S$_v$ groups are within 2 carbons of each other. Thus, cyclopentadienyl rings substituted at the 2 and the 2' positions with methyl and ethyl respectively, or substituted at the 3 and the 3' positions with hexyl and octyl respectively, would be considered symmetrical. Likewise, the cyclopentadienyl rings may be substituted at all four sites with S$_v$ groups and be considered symmetrical as long as each of the symmetrical pairs are of similar steric bulk. Additionally, two adjacent S$_v$ groups may be linked to form a ring provided that the new ring is also symmetrically substituted.

Illustrative, but not limiting examples of preferred transition metal compounds of formula (4) are the racemic isomers of:

μ-(CH$_3$)$_2$Si(indenyl)$_2$ M(Cl)$_2$
μ-(CH$_3$)$_2$Si(indenyl)$_2$ M(CH$_3$)$_2$
μ-(CH$_3$)$_2$Si(tetrahydroindenyl)$_2$ M(Cl)$_2$
μ-(CH$_3$)$_2$Si(tetrahydroindenyl)$_2$ M(CH$_3$)$_2$
μ-(CH$_3$)$_2$Si(indenyl)$_2$ M(CH$_2$CH$_3$)$_2$
μ-(C$_6$H$_5$)$_2$C(indenyl)$_2$ M(CH$_3$)$_2$ wherein M is chosen from a group consisting of Zr and HE The transition metal compounds described above are typically activated in various ways to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, 6-bound, metal ligand making the metal complex cationic and providing a charge-balancing noncoordinating or weakly coordinating anion.

Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

Alumoxanes may be produced by the hydrolysis of the respective trialkylaluminum compound. MMAO may be produced by the hydrolysis of trimethylaluminum and a higher trialkylaluminum such as tri-iso-butylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European Publications EP-A-0 561 476, EP-B-0 279 586, EP-A-0 594-218 and EP-B1-0 586 665, and PCT Publication Nos. WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another particularly useful alumoxane is a modified methyl alumoxane (MMAO) cocatalyst type 3A (commercially available from Akzo Chemicals, Inc. under the trade name Modified Methylalumoxane type 3A, and disclosed in U.S. Pat. No. 5,041, 584).

In addition to or in place of alumoxanes, the transition metal compounds described herein can be activated using ionizing or stoichiometric activator, neutral or ionic, such as tri(n-butyl)ammonium tetrakis(pentafluorophenyl)boron, a trisperfluorophenyl boron metalloid precursor or a trisperfluoronaphthyl boron metalloid precursor, polyhalogenated heteroborane anions (WO 98/43983), boric acid (U.S. Pat. No. 5,942,459) or combination thereof.

Examples of neutral stoichiometric activators include trisubstituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference. Ionic catalysts can be preparedly reacting a transition metal compound with a neutral Lewis acid, such as $B(C_6F_6)_3$, which upon reaction with the hydrolyzable ligand (X) of the transition metal compound forms an anion, such as ([B$(C_6F_5)_3(X)]^-$), which stabilizes the cationic transition metal species generated by the reaction.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

$(L-H)_d^+(A^{d-})$ wherein L is an neutral Lewis base; H is hydrogen; (L-H)$^+$ is a Bronsted acid; $A^{d-}$ is a non-coordinating anion having the charge d−; and d is an integer from 1 to 3, e.g., 1, 2 or 3.

The cation component, $(L-H)_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component, $A^{d-}$, may include an anion having the formula 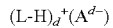 wherein k is an integer from 1 to 3; n is an integer from 2-6; n−k=d; M is an element selected from Group 13 of the Periodic Table of the Elements, particularly boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of the ionic stoichiometric activator $(L-H)_d^+ (A^{d-})$ is N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion may be employed, such as is described in EP-A-0 426 637, EP-A-0 573 403 and U.S. Pat. No. 5,387,568, which are all herein incorporated by reference. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in the present process are those that are compatible, stabilize the metallocene cation in the sense of balancing its ionic charge at +1 yet retain sufficient lability to permit displacement by an ethylenically or acetylenically unsaturated monomer during polymerization. These types of cocatalysts sometimes use tri-isobutyl aluminum or tri-octyl aluminum as a scavenger.

The polymerization process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl)boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0,495,375. For formation of zwitterionic complexes using analogous Group 4 compounds, see U.S. Pat. Nos. 5,624,878; 5,486,632; and 5,527,929.

When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The catalyst systems used to produce the present copolymer may also include a support material or carrier. For example, the one or more catalyst components and/or one or more activators may be deposited on, contacted with, vaporized with, bonded to, or incorporated within, adsorbed or absorbed in, or on, one or more supports or carriers. The support material may be any of the conventional support materials. Preferably the support material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Typical support materials are inorganic oxides that include those Group 2, 3, 4, 5, 13 or 14 metal oxides, such as silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

When present, the support material typically has a surface area in the range of from about 10 to about 700 m²/g, pore volume in the range of from about 0.1 to about 4.0 cc/g and average particle size in the range of from about 5 to about 500 µm. More preferably, the surface area of the support material is in the range of from about 50 to about 500 m²/g, pore volume of from about 0.5 to about 3.5 cc/g and average particle size of from about 10 to about 200 µm. Most preferably the surface area of the support material is in the range is from about 100 to about 400 m²/g, pore volume from about 0.8 to about 3.0 cc/g and average particle size is from about 5 to about 100 µm. The average pore size of the support material is typically in the range of from 10 to 1000 Å, preferably 50 to about 500 Å, and most preferably 75 to about 350 Å.

Additives

The in-reactor polymer blend described herein may optionally be combined with one or more polymer additives known in the art, such as reinforcing and non-reinforcing fillers, scratch resistant agents, plasticizers, antioxidants, stabilizers, extender oils, lubricants, antiblocking agents, antistatic agents, waxes, foaming agents, pigments, flame retardants and other processing aids known in the rubber compounding art. Such additives may comprise up to about 70 weight percent, more preferably up to about 65 weight percent, of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The oils are selected from those ordinarily used in conjunction with the specific rubber or rubber component present in the composition.

The additives such as fillers and oils can be introduced into the in-reactor polymer blend during the polymerization in either the first polymerization zone or the second polymerization zone. The additives can be added into the effluent from the second polymerization zone but are preferably added into the polymer blend after removal of solvent or diluent through melt blending.

Additional polymers can also be added to form blends. In one or more embodiments, the additional polymers include thermoplastic resins or thermoplastic elastomers. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the homo-polypropylene, impact, and random copolymers of propylene with ethylene or the higher α-olefins, described above. Preferably, the homopolypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for these propylene copolymers will typically be from 1 to about 30% by weight of the polymer (See, for example, U.S. Pat. Nos. 6,268,438, 6,288,171, and 6,245,856. Copolymers available under the trade name VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Uses of the In-Reactor Polymer Blends

The in-reactor polymer blends described herein may be shaped into desirable end use articles by any suitable means known in the art. They are particularly useful for making articles by injection molding, blow molding, film blowing, extrusion, thermoforming, gas foaming, elasto-welding and compression molding techniques.

Thermoforming is a process of forming at least one pliable plastic sheet into a desired shape. An embodiment of a thermoforming sequence is described; however, this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which preheats the film before forming Once the film is heated, the shuttle rack indexes back to the forming tool. The film is then vacuumed onto the forming tool to hold it in place and the forming tool is closed. The forming tool can be either "male"

or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process useful herein is described as follows. The shaped laminate is placed into the injection molding tool. The mold is closed and the substrate material is injected into the mold. The substrate material is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 µm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material in injection molded into a tool including the shaped laminate, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

Preferred articles made using the compositions of this invention include sheets, crates, containers, bottles, packaging, wire and cable jacketing, pipes, geomembranes, tubing, pipes, automotive, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

In another embodiment, this invention relates to:

1. An in-reactor polymer blend comprising at least 60 mole % of propylene and from 0.01 to 10 mole % of at least one diene selected from the group consisting of $C_6$ to $C_{12}$ $\alpha,\omega$-dienes, norbornadiene, vinyl norbornene and mixtures thereof with the balance being ethylene, wherein the blend comprises first and second polymers having different crystallinities and glass transition in which at least the second polymer comprises at least one branch of the first polymer per 10,000 carbon atoms of the in-reactor blend as observed by $^{13}C$ NMR, wherein the blend has the following properties:

a) a highest melting temperature of 120° C. or more and a lowest glass transition temperature of -20° C. or less as determined by Differential Scanning Calorimetry (second melt);

(b) a branching index (g') of 0.9 or less as determined by the formula:

$$g' = \frac{\eta_b}{\eta_l}$$

where $\eta_b$ is the intrinsic viscosity of the in-reactor polymer blend and $\eta_l$ is the intrinsic viscosity of a linear polypropylene of the same viscosity-averaged molecular weight ($M_v$) as the in-reactor polymer blend, where $\eta_l = KM_v^\alpha$, where K=0.0002288 and $\alpha$=0.705;

(c) a critical relaxation exponent, n, of greater than 0 and less or equal to 0.8; and (d) at least 90 wt % of the blend is soluble in refluxing xylenes at 138° C.

2. The blend of paragraph 1 wherein the blend has: (a) a first melting temperature of 130° C. or more and a first glass transition temperature, Tg, of 20° C. or less as determined by Differential Scanning Calorimetry; and (b) a second melting temperature at least 20° C. different than the first melting temperature as determined by Differential Scanning Calorimetry or a second Tg at least 20° C. different than the first Tg as determined by Differential Scanning Calorimetry.

3. The blend of paragraph 1, wherein said second melting temperature is at least 40° C. and is at least 20° C. less than the first melting temperature.

4. The blend of paragraph 1 or 2, wherein said first polymer is a propylene/ethylene copolymer and said second polymer is a propylene homopolymer.

5. The blend of paragraph 1, 2, or 3, wherein said first polymer is a propylene homopolymer and said second polymer is a propylene/ethylene copolymer.

6. The blend of paragraph 1, 2, 3, or 4, wherein said first polymer is a propylene/ethylene copolymer with a first ethylene content and said second polymer is a propylene/ethylene copolymer with second, higher ethylene content.

7. The blend of paragraph 1, 2, 3, or 4, wherein said first polymer is a propylene/ethylene copolymer with a first ethylene content and said second polymer is propylene/ethylene copolymer with a second, lower ethylene content.

8. The blend of any of paragraphs 1 to 6, wherein said at least one diene comprises 1,9-decadiene, vinyl norbornene, and/or norbornadiene.

9. The blend of any of paragraphs 1 to 8, said blend having a viscosity fraction of chains with relaxation times of 100 seconds or more of at least 0.25.

10. The blend of any of paragraphs 1 to 8, said blend having a secant slope for the log(dynamic viscosity) versus log(frequency) curve of less than -0.25.

11. An in-reactor polymer blend comprising at least 80 mole % of ethylene and from 0.01 to 10 mole % of at least one diene selected from the group consisting of norbornadiene, vinyl norbornene, $C_6$ to $C_{12}$ $\alpha,\omega$-dienes, and mixtures thereof with the balance being an alpha-olefin selected from the group consisting of propylene, butene, pentene, hexene, and mixtures thereof wherein the blend comprises first and second polymers having different crystallinities in which at least the second polymer comprises at least one branch of the first polymer having 8 or more carbon atoms per 10,000 carbon atoms as observed by $^{13}C$ NMR, wherein the blend has the following properties:

(a) a first melting temperature of 70° C. or more and a first Tg of 20° C. or less as determined by Differential Scanning Calorimetry;

(b) a second melting temperature at least 20° C. different than the first melting temperature as determined by Differential Scanning Calorimetry or a second Tg at least 20° C. different than the first Tg as determined by Differential Scanning Calorimetry;

(c) at least one branch point per 10,000 carbon atoms, as determined by Carbon 13 NMR; and (d) a critical relaxation exponent, n, of greater than 0 and less or equal to 0.8.

12. The blend of paragraph 11, wherein said second melting temperature is at least 40° C. and is at least 20° C. less than the first melting temperature.

13. The blend of paragraph 11 or 12, wherein at least 90 wt % of the blend is soluble in refluxing xylene at 138° C.

14. The blend of paragraph 11, 12, or 13, said blend having a viscosity fraction of chains with relaxation times of 100 seconds or more of at least 0.25.

15. The blend of paragraph 11, 12, 13, or 14, said blend having a secant slope for the log(dynamic viscosity) versus log(frequency) curve of less than -0.25.

16. A process for producing an in-reactor polymer blend, the process comprising:

(i) contacting a first monomer composition comprising propylene, from 0.01 to 10 mole % of one or more dienes selected from the group consisting of $C_6$ to $C_{12}$ $\alpha,\omega$-dienes, norbornadiene, vinylnorbornene, and mixtures thereof and optionally ethylene in a first polymerization stage with a metallocene first catalyst which is capable of polymerizing said first monomer composition to produce a first polymer and which is also capable of incorporating said diene into the first polymer such that the product of the first polymerization stage is a propylene-containing first polymer comprising more than one olefinic unsaturation per chain and from 0.1 to 10 mole % diene; and (ii) contacting at least part of the product of the first polymerization stage with a second monomer composition comprising propylene and optionally ethylene in a second polymerization stage with a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition and wherein the partial pressure of said second monomer composition is kept below 1000 kPa during said second polymerization stage.

17. The process of paragraph 16, wherein said first polymerization stage is conducted in the presence of hydrogen.

18. The process of paragraph 16 or 17, wherein second catalyst comprises at least one metallocene catalyst.
19. The process of paragraph 16, 17, or 18, wherein said at least one diene comprises 1,9-decadiene or vinyl norbornene.
20. The process of paragraph 16, 17, 18, or 19, wherein said at least one diene comprises norbornadiene.
21. A process for producing an in-reactor polymer blend, the process comprising:

(i) contacting a first monomer composition comprising ethylene, from 0.01 to 10 mole % of one or more dienes selected from the group consisting of $C_6$ to $C_{12}$ α,ω-dienes, norbornadiene, vinylnorbornene, and mixtures thereof and optionally propylene, butene, pentene hexene or mixtures thereof in a first polymerization stage with a metallocene first catalyst which is capable of polymerizing said first monomer composition to produce a first polymer and which is also capable of incorporating said diene into the first polymer such that the product of the first polymerization stage is an ethylene-containing first polymer comprising more than one olefinic unsaturation per chain and from 0.1 to 10 mole % diene; and (ii) contacting at least part of the product of the first polymerization stage with a second monomer composition comprising propylene and optionally ethylene in a second polymerization stage with a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition.

22. The process of paragraph 21, wherein said first polymerization stage is conducted in the presence of hydrogen.
23. The process of paragraph 21 or 22, wherein second catalyst comprises at least one metallocene catalyst.
24. The process of paragraph 21, 22, or 23, wherein said at least one diene comprises norbornadiene.

The invention will now be more particularly described with reference to the accompanying non-limiting Examples and the accompanying drawings.

In the Examples, peak melting point (Tm) and peak crystallization temperature (Tc), glass transition temperature (Tg), and heat of fusion were determined using the following procedure according to ASTM D3418-03. Differential scanning calorimetric (DSC) data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes and then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the degree of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B were obtained from the Polymer Handbook, Fourth Edition, published by John Wiley and Sons, New York 1999. A value of 189 J/g (B) was used as the heat of fusion for 100% crystalline polypropylene. A value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent of crystallinity is calculated using the sum of heat of fusion from all endothermic peaks. Prior to the DSC measurement, the sample was aged (typically by holding it at ambient temperature for a period up to about 2 days) or annealed to maximize the level of crystallinity.

Molecular weights (number average molecular weight (Mn), weight average molecular weight (Mw), and z-average molecular weight (Mz)) were determined using a Polymer Laboratories Model 220 high temperature SEC (Size Exclusion Chromatograph) with on-line differential refractive index (DRI), light scattering, and viscometer detectors. It used three Polymer Laboratories PLgel 10 m Mixed-B columns for separation, a flow rate of 0.54 $cm^3$/min, and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Proton NMR spectra were collected using a 500 MHz Varian pulsed fourier transform NMR spectrometer equipped with a variable temperature proton detection probe operating at 120° C. The polymer sample is dissolved in 1,1,2,2-tetrachloroethane-d2 (TCE-d2) and transferred into a 5 mm glass NMR tube. Typical acquisition parameters are sweep width=10 KHz, pulse width=30 degrees, acquisition time=2 s, acquisition delay=5 s and number of scans=120. Chemical shifts are determined relative to the TCE-d2 signal which is set to 5.98 ppm.

The chain end unsaturations are measured as follows. The vinyl resonances of interest are between from about 5.0 to 5.1 ppm (VRA), the vinylidene resonances between from about 4.65 to 4.85 ppm (VDRA), the vinylene resonances from about 5.31 to 5.55 ppm (VYRA), the trisubstituted unsaturated species from about 5.11 to 5.30 ppm (TSRA) and the aliphatic region of interest between from about 0 to 2.1 ppm (IA). The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2)+TSRA) and the number of trisubstituted groups from the formula (TSRA*1000)/((IA+VRA+VYRA+VDRA)/2)+TSRA).
VRA, VDRA, VYRA, TSRA and TA are the integrated normalized signal intensities in the chemical shift regions defined above.

The compositions of the in-reactor blends of this invention can also be analyzed using proton NMR and a technique based upon earlier assignments by H. H. Cheng and G. H. Lee (*J. Poly. Sci.: Part B: Poly. Phys.*, 25, 2355-2370 (1987)). Cheng and Lee carried out two-dimensional analysis of ethylene-propylene copolymers and correlated the proton spectra with the $^{13}C$ spectra. They developed a method to analyze ethylene-propylene copolymers using Markovian probabilities and fits to the aliphatic region of the proton NMR spectrum. Because the in-reactor blends of this invention contain only isotactic polypropylene and ethylene-propylene copolymers, they can also be analyzed by fitting two sets of Markovian probabilities. Markovian probabilities (of the $1^{st}$ order) are the probability of inserting a new monomer of a specific type given the last monomer inserted was of a specific type. For an ethylene-propylene copolymer there are four probabilities: the probability of ethylene after ethylene, the probability of propylene after ethylene, the probability of ethylene after propylene, and the probability of propylene after propylene. There are only two independent probabilities since the probabilities of monomers after ethylene must add to 1 and the probabilities of monomers after propylene must add to 1. For isotactic polypropylene the Markovian probability for inserting propylene after propylene is one and the others are all zero. To analyze the composition of the in-reactor blends, there are four parameters which need to be fit: the moles of polypropylene (molesP), the moles of ethylene/propylene copolymer (molesEP), the probability of a propylene inserting after an ethylene in the copolymer (β), and the probability of an ethylene inserting after a propylene (α). Six peaks are integrated in the aliphatic region of the proton NMR: a. 0.086 to 1.04 ppm, b. 1.10 to 1.25 ppm, c. 1.25 to 1.41 ppm, d. 1.41 to 1.52 ppm, e. 1.52 to 1.6 ppm, and f. 1.6 to 1.72 ppm. These six peak areas are least squares fit with the following formulas written in terms of the four unknowns using the solver in Excel.

molesP+molesEP*β*(1−α)²/(α+β)   a.

molesEP*2*α*β*(1−α)/(α+β)   b.

molesEP*α²*β/(α+β)   c.

molesP+molesEP*(β*(1−α)+2α*β²+2α*β+4α*β*(1−β)+2α*(1−β)+2α*(1−β)²)/(α+β)   d.

molesEP*2αβ/(α+β)   e.

4*molesP+molesEP*(4β−αβ)/(α+β)   f.

Total area: 6*molesP+molesEP*(4α+6β)/(α+β).

In terms of these unknowns, the mole fraction of ethylene in the ethylene/propylene copolymers is α/(α+β) and the mole fraction of propylene in the ethylene/propylene copolymer is β/(α+β). Mole fraction of isotactic polypropylene in the in-reactor blend is molesP/(molesP+molesEP) and the mole fraction of ethylene/propylene copolymer is molesEP/(molesP+molesEP). With the Markovian probabilities for the ethylene/propylene copolymer, the probability of any triad can be calculated. In particular, the probability of the ethylene-ethylene-ethylene triad occurring in the ethylene/propylene copolymer is given by α*(1−β)²/(α+β).

In conducting the $^{13}C$ NMR investigations, samples are prepared by adding about 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1H$ frequencies of either 400 or 700. The data are acquired using nominally 4000 transients per data file with a about a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe.

The vinyl groups on the chain ends of polymers in both the first and second polymerizations can insert to make long chain branches. These long chain branches are of the "Y" type, where three chains meet at a single methine carbon. The peaks corresponding to methylenes adjacent to these branch points are found between 44 and 45 ppm. Assignments for long chain branches of iPP chains are discussed by Weng, Hu, Dekmezian, and Ruff (Macromolecules 2002, 35, 3838-3843). For propylene branches between propylenes in the backbone the methylenes are found at 44.88, 44.74, and 44.08 ppm. The methine of the branch is found at 31.84 ppm. For ethylene long chain branches in ethylene, Randall (*Polymer Reviews* 29 (2), pp. 201-317, (1989)) describes a method to measure them. In the polymers of this invention long chain branches between ethylene/propylene chains and isotactic polypropylene chains have been found at 44.68, 44.83, 44.92 ppm.

Melt flow rate (MFR) was determined according to ASTM D1238 using a load of 2.16 kg at 230° C.

Small Amplitude Oscillatory Shear testing was performed on a dynamic (oscillatory) rheometers such as Anton Parr Physica MCR500 or MCR501. The polymer specimen is compression molded to a wafer of approximately 25 mm diameter and thickness between 1.5 to 2 mm. The sample is stabilized with commercially available materials (such as Irgaonox™ 1076, Irganox™ 168, and or polyethylene glycol) to prevent thermally induced chemical changes. The dynamic rheometer is used in the dynamic mode (as opposed to steady state mode) using the parallel plates geometry, at a constant temperature of 190° C., letting the angular frequency to vary from 0.01 to 100 rad/s. Linear response of the tested polymer melt should be ensured by using small amplitudes chosen from previous amplitude scans of the linear region of the sample.

Dynamic shear melt rheological data was measured with an Advanced Rheometrics Expansion System (ARES) using parallel plates (diameter=25 mm) at several temperatures (150, 170, 190 and 210° C.) using a pristine compression molded sample at each temperature. The viscosity measurements were made over the angular frequency ranged from 0.01-100 rad/s. Depending on the molecular weight and temperature, strains of 10% and 15% were used and linearity of the response was verified. A $N_2$ stream was circulated through the sample oven to minimize chain extension or cross-linking during the experiments. All the samples were compression molded at 190° C. and no stabilizers were added. A sinusoidal shear strain is applied to the material if the strain amplitude is sufficiently small the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials 0<δ<90.

Examples 1 to 5

A series of copolymers of propylene and norbornadiene were produced using the conditions summarized in Table 1 below. The catalyst system comprised a dimethylsilyl bis(2-methyl,4-phenyl indenyl)zirconium dimethyl (cat 1) precatalyst activated by dimethylanilinium tetra(perfluoronaphthyl) borate (act 1) dissolved in toluene. 100 mL of propylene in 150 mL of toluene with 0.10, 0.25, 0.50, 1.00, and 2.00 mL of norbornadiene added were the monomer concentrations. The polymerizations were conducted at 100° C. and the pressures under these conditions were from 180 to 280 psig.

The polymerizations were carried out in an Autoclave Engineers 0.5 liter zipperclave with mechanical stirring. Temperatures were controlled using a steam jacket with an Omega PID controller. After purging the autoclave for at least two hours using dry nitrogen, dry, air free toluene was introduced using a sight glass. The norbornadiene was cannellated into the reactor while dry nitrogen was flowing. The propylene was introduced as a liquid using a sight glass and the reactor was heated to the desired temperature. Catalyst solution containing the metallocene precursor, activator, and scavenger was cannellated into a catalyst feed bomb. The catalyst solution was pumped into the reactor at pressure and temperature using an ISCO HPLC pump at rates between 0.250 and 0.375 ml/min. After the listed times the catalyst fed was stopped, the reactor was cooled to below 50° C. and the reactor contents were drained through the bottom valve of the autoclave. Polymers were precipitated using methanol, redissolved a second time in 100° C. toluene, and reprecipitated. The solids were filtered and placed in an 80° C. vacuum oven overnight to remove the residual volatiles.

TABLE 1

| Example | 1 | 2 | 3 | 4 | 5 |
|---|---|---|---|---|---|
| Rxrl T (° C.) | 100 | 100 | 100 | 100 | 100 |
| C3 (ml) | 100 | 100 | 100 | 100 | 100 |
| Norbornadiene (ml) | 0.10 | 0.25 | 0.50 | 1.0 | 2.0 |
| Toluene (ml) | 150 | 150 | 150 | 150 | 150 |
| Cat1 (mg) | 7.5 | 7.5 | 4.5 | 4.5 | 13.4 |
| Act1 (mg) | 14.5 | 14.5 | 9.0 | 7.5 | 18.2 |
| TIBAL (ml) | 10 | 10 | 10 | 10 | 10 |
| Total Cat Sol'n (ml) | 125 | 125 | 100 | 100 | 240 |
| Cat Sol'n Used (ml) | 14.5 | 20.25 | 41.5 | 71.25 | 203.9 |
| Reaction time (min) | 45 | 54 | 72 | 177 | 163 |
| Initial Press (psig) | 274.6 | 263 | 262.4 | 253.0 | 226 |
| Final Press (psig) | 203.1 | 183 | 182.4 | 172.0 | 160.7 |
| Yield (g) | 18.57 | 16.52 | 16.43 | 14.83 | 26.60 |

A labeled $^{13}$C NMR spectrum of the propylene/norbornadiene copolymer made according to Example 5 is shown in FIG. 1, in which the large peaks labeled as CH2, CH, and CH4 are due to the methylene, methine, and methyl carbons of the propylene monomers inserted 1, 2 in the chain. The small peaks labeled e and i are carbons in propylenes that are 2,1-erythro and 1,3 inserted. The pr and is peaks are from carbons in the saturated propyl and isobutyl chain ends of the copolymer. The v and a peaks are carbons in the unsaturated vinylidene and allyl chain ends. The allyl carbons are next to the vinyl chain ends that can insert to make long chain branches. The S, P, and T peaks are methylenes, methyls, and methines near a norbornadiene. The peaks with C labels are carbons in norbornadienes that have inserted only one double bond, while BC peaks are from carbons in norbornadienes that inserted both double bonds. There appear to be two isomers of norbornadienes that have inserted only one double bond; see labels 1 and 1'. There are also two isomers of norbornadienes that have inserted both double bonds; see peaks under the label of BC4.

Figure 2:
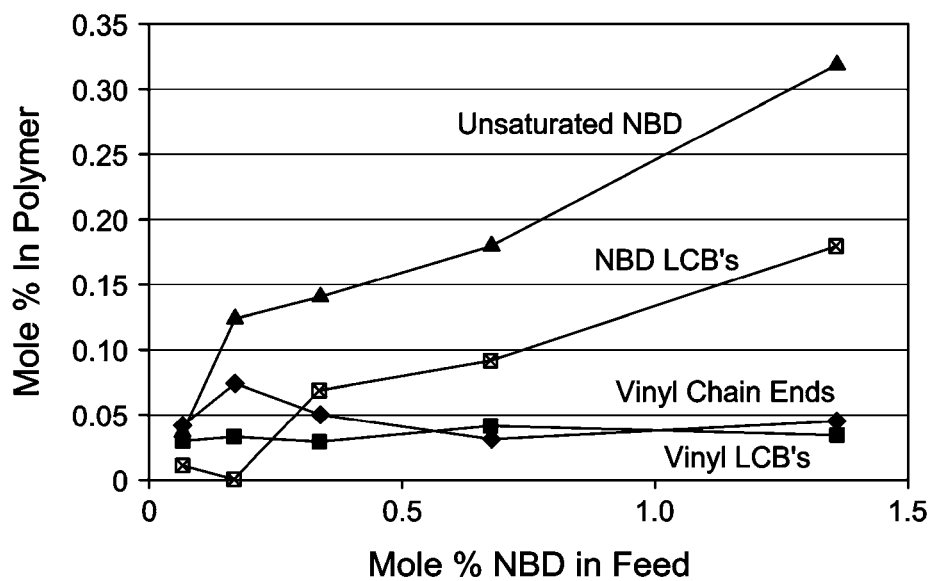
FIG. 2 plots the mole % of different unsaturated groups against the mole % norbornadiene in the feed for the propylene/norbornadiene copolymers made according to Examples 1 to 5.

Some of the compositional analyses of the copolymers of Examples 1 to 5 derived from their $^{13}$C NMR spectra are presented in Table 2 and FIG. 2. The concentrations in FIG. 2 and Table 2 were calculated by integrating the peaks assigned in FIG. 1 and are in mole % of the carbons in the spectra. The curve labeled unsaturated norbornadiene (UNBD) is the sum of the C7 and C1' peaks and is a measure of the norbornadienes that were incorporated but still have a residual norbornenyl double bond left unreacted. The NBD LCB curve is a plot of the sum of the two peaks labeled as BC4. It gives the concentrations of the norbornadienes, where both the first and second double bonds have been incorporated into the first polymer. These norbornadienes are at the branch points of long chain branches formed through the dienes. The vinyl LCB and vinyl peaks are plots of the intensities of the asterix and a3 peaks in FIG. 1. They are branch points formed by the incorporation of vinyl chain ends (asterix) and the concentration of the vinyl chain ends left uninserted (a3).

TABLE 2

| Example | 1 | 2 | 3 | 4 | 5 |
|---|---|---|---|---|---|
| $^{13}$C-NMR: | | | | | |
| 1,2 propylenes | 99.15% | 99.04% | 99.02% | 99.14% | 98.21% |
| 2,1 propylenes | 0.31% | 0.34% | 0.31% | 0.25% | 0.18% |
| 1,3 propylenes | 0.30% | 0.32% | 0.31% | 0.25% | 0.31% |
| Vinyl chain ends | 0.04% | 0.07% | 0.05% | 0.03% | 0.04% |
| Vinyl LCBs | 0.03% | 0.03% | 0.03% | 0.04% | 0.03% |
| UNBD | 0.07% | 0.20% | 0.20% | 0.24% | 0.52% |
| NBD LCBs | 0.01% | N.D. | 0.07% | 0.09% | 0.18% |
| $^1$H-NMR: | | | | | |
| vinyls | 0.06% | 0.05% | 0.04% | 0.08% | 0.10% |
| vinylidenes | 0.07% | 0.08% | 0.07% | 0.11% | 0.11% |
| UNBD | 0.04% | 0.08% | 0.12% | 0.23% | 0.76% |
| SEC: | | | | | |
| LS-Mn | 42K | 38K | 33K | 26K | 17K |
| LS-Mw | 95K | 80K | 65K | 48K | 32K |
| LS-Mz | 200K | 164K | 112K | 79K | 56K |
| g' (vis. Avg.) | 0.969 | 0.965 | 0.975 | 0.991 | 0.983 |
| g' (Z Avg.) | 0.948 | 0.927 | 0.945 | 0.967 | 0.944 |

As the amount of norbornadiene, NBD, is increased in the reactor, more is incorporated into the polymers. For the highest concentration of norbornadiene added to the reactor, 1.4 mole %, about 0.7 mole percent of the norbornadiene was inserted into the chains according to the $^{13}$C spectra. Of this incorporated norbornadiene, 26% had the second double bond also insert, leading to 9.2 norbornadiene long chain branches per 10000 carbons. This is three times the highest level of long chain branches observed with the vinyl chain ends in the study of long chain branched polypropylenes by Weng, Hu, Dekmezian, and Ruff (Macromolecules 2002, 35, 3838-3843). The propylene pressures were also more typical of a normal polypropylene polymerization in the range of 140-226 psi and would be viable commercially. The residual double bonds of the propylene-norbornadiene copolymers are able to react under these conditions, because they are present at much higher concentrations than the vinyl chain ends (0.04 mole % of the polymers) and are also much more reactive. Note also that the concentrations of the singly and doubly inserted norbornadienes are increased, as a higher concentration is fed into the reactor. The vinyl chain ends and vinyl long chain branches are relatively unchanged, as more norbornadiene is fed. Thus, the invention gives copolymers with controlled and much higher levels of long chain branches and reactive double bonds for incorporation in the second polymerization.

Figure 3:
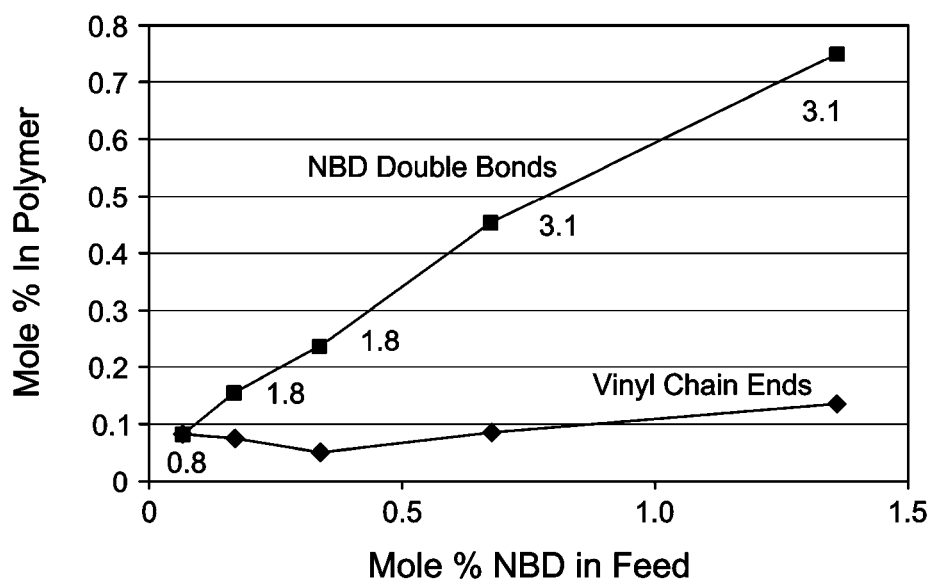
FIG. 3 plots the mole % of residual double bonds in the incorporated norbornadienes and the mole % of vinyl chain ends for the propylene/norbornadiene copolymers of Examples 1 to 5.

$^1$H-NMR can also be used to analyze the unsaturations of the propylene-norbornadiene copolymers in Examples 1-5. There are two types of incorporated norbornadiene double bonds at chemical shifts of 6.07 to 6.20 ppm. Vinyl chain ends are the peaks at 5.0 to 5.1 ppm in these spectra. The concentrations of these unsaturations are presented in Table 2 and FIG. 3. As the norbornadiene concentration is increased in the feed, the concentration of norbornadiene double bonds in the polymers increase. For the feed concentration of 1.4 mole %, $^1$H-NMR records a concentration of 0.76 mole %, which is five times the vinyl chain end concentration. This why the approach of this invention can lead to much higher levels of cross-products (or long chain branches) than any method based upon inserting only the vinyl chain ends. The numbers under the plot are the number of norbornadienes per chain that are available for cross-products. Keeping in mind that, according to the $^{13}$C NMR, about a third of the norbornadiene has already formed long chain branches, these propylene-norbornadiene copolymers could end up with on the average one long chain branch and three cross-product branches. Clearly, many more branches than have ever been reported previously in the literature.

Size exclusion chromatography, SEC-DRI-LS-VIS, data were also collected for the propylene/norbornadiene copolymers in Examples 1-5 and are presented in Table 2. As more norbornadiene is added to the reactor, the molecular weights are seen to decrease.

The two branching index g'(vis) and g'(Z. avg) are defined as ratios of average intrinsic viscosities:

$$g' = \frac{\eta_b}{\eta_l}$$

where $\eta_b$ is the average intrinsic viscosity of the branched polymer and $\eta_l$ is the intrinsic viscosity of a linear polymer of the same viscosity-averaged molecular weight ($M_v$) as the branched polymer. In the averages, the intrinsic viscosity of a linear polypropylene is $KM_i^\alpha$, where K=0.0002288 and α=0.705. The viscosity averaged g' was calculated using the following equation:

$$g'_{vis} = \frac{\sum C_i [\eta_i]_b}{\sum C_i K M_i^\alpha}$$

where $C_i$ is the polymer concentration in the slice i in the polymer peak, and $[\eta_i]_b$ is the viscosity of the in-reactor blend in slice i of the polymer peak, and $M_i$ is the weight averaged molecular weight in slice i of the polymer peak measured by light scattering, K and α are the parameters for linear polypropylene. The Z average g' was calculated using $C_i$=polymer concentration in the slice i in the polymer peak times the mass of the slice squared, $M_i^2$. g'(Z avg.) gives heavier weighting to the high molecular weight components of the blends.

When the g' values are below one, the samples are less viscous than linear polypropylene due to long chain branching or cross-products. Typically, g'(Z avg) is smaller than g'(vis) because higher molecular weight chains are more likely to have long chain branches or cross-products.

Figure 6:
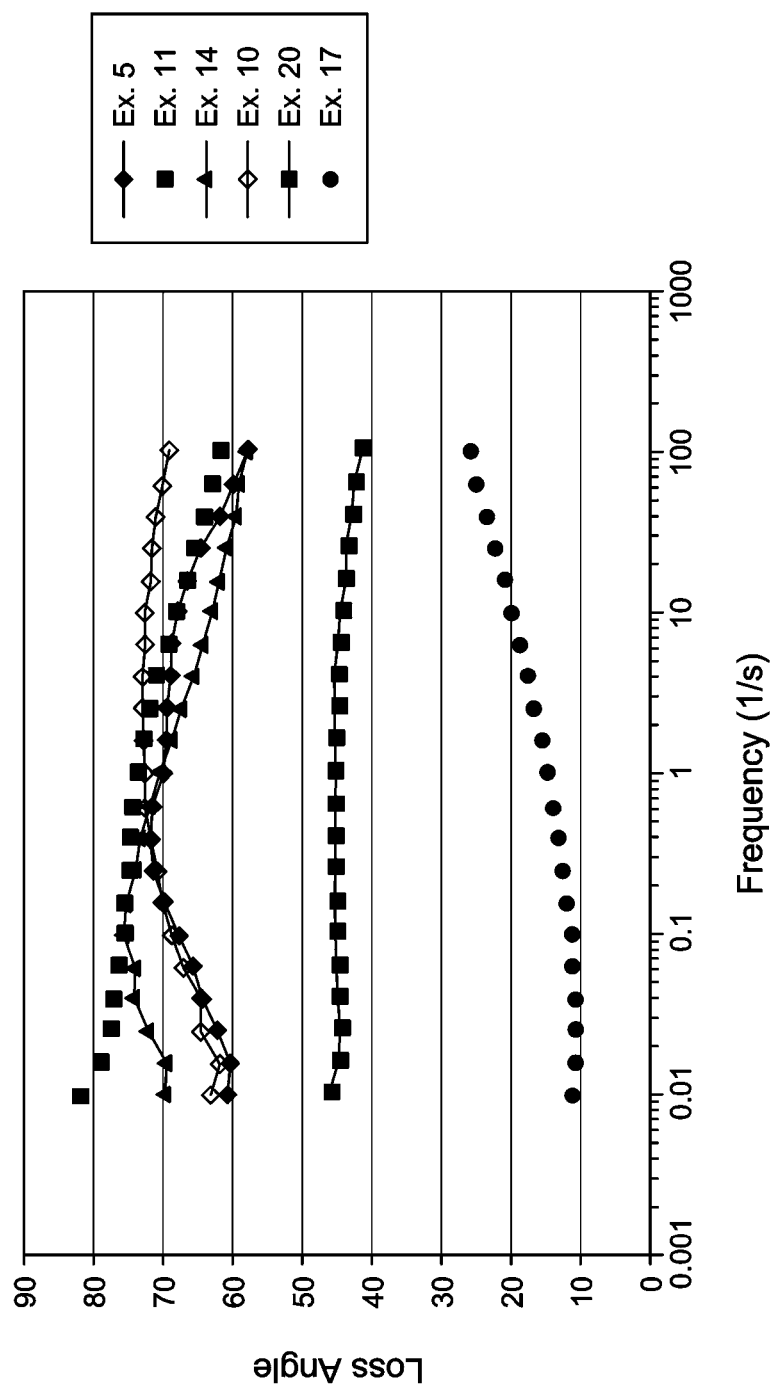
FIG. 6 plots the loss angle versus frequency from the small angle oscillatory shear data for the reactor blends of isotactic polypropylene and ethylene-propylene-norbornadiene produced in Example 5 and certain of Examples 10 to 20.

Small angle oscillatory shear (SAOS) data was collected for Example 5 at 150° C. In a plot of the loss angle, 6, versus frequency all points are at angles below 72 degrees (see FIG. 6), also suggesting a high level of branching. The loss angles are nearly independent of frequency and the value of the critical relaxation exponent, n, was 0.77. The relaxation spectrum was calculated and the viscosity fraction of the polymer with a 100 second relaxation time was 0.916. All these rheology measurements confirm that nearly all the chains of Example 5 contain long chain branches.

Example 6

In Example 6 propylene/norbornadiene copolymers made in the first polymerization zone are further reacted with ethylene and propylene in a second polymerization. The catalyst solution comprised 15 mg rac-dimethylsilyl bis(2-methyl,4-phenyl indenyl)zirconium dimethyl (cat 1) precatalyst activated by 28 mg dimethylanilinium tetra(heptafluoronaphthyl)borate (act 1) dissolved in 115 ml of toluene. The catalyst solution was prepared in a drybox and then cannellated into a catalyst feed bomb. The polymerizations were carried out in an Autoclave Engineers 0.5 liter zipperclave with mechanical stirring. Temperatures were controlled using a steam jacket with an Omega PID controller. After purging the autoclave for at least two hours using dry nitrogen, 50 ml of dry, air free toluene was introduced using a sight glass. 1.0 ml of 1 molar tri(isobutyl)aluminum in hexane (TIBAL) and 1.0 ml of norbornadiene were cannellated into the reactor. For the first polymerization 100 mL of propylene was added using a sight glass. The reactor was heated to 101.3° C. and catalyst feed was started at 1.0 ml/min. Initial pressure was 354.2 psig. After 30 min the catalyst feed was stopped. The reactor pressure was 274.2 psig and a total of 30 ml of catalyst solution had been added. The reactor was vented down to less than 5 psig, making sure that no air got inside. An additional 100 ml of toluene and 100 ml of propylene were added, and the reactor temperature was raised to 71.4° C. After the temperature stabilized the reactor pressure was 234.4 psig. Ethylene head pressure was set at 384.3 psig and was added to the reactor using a Matheson pressure controller. During the second polymerization the reactor's pressure was maintained at 384.3 psig by the intermittent addition of ethylene through the pressure controller. The flow of the catalyst solution was restarted at 0.5 ml/min. After 8 minutes, 20 liters (STP) of ethylene had been added. Total catalyst solution added during the second polymerization was 4.0 ml. The reactor was cooled to below 50° C. and the reactor contents were drained through the bottom valve of the autoclave. Polymers were precipitated from the reactor solution using methanol. The solids were filtered and placed in an 80° C. vacuum oven overnight to remove the residual volatiles. Yield was 41.4 g.

Molecular weights using the light scattering detector in the SEC-DRI-LS-VIS experiment were Mn=28K, Mw=89K, and Mz=285. The molecular weight distributions were Mw/Mn=3.14 and Mz/Mw=3.22, indicative of some cross-products at high molecular weights. The intrinsic viscosity versus molecular weight curve bends significantly downward, probably as the result of cross-products. The polymer below about 300K has a higher intrinsic viscosity than linear polypropylene, as expected for ethylene/propylene copolymers. However, above about 300K the polymer is less viscous than linear polypropylene, as the result of long chain branches and cross-products. The g'(visc) and g'(Z avg) numbers were 1.166 and 1.013. The Z average value for g' is significantly lower than the viscosity average g', because it weights the high molecular weight components more heavily.

The $^1$H-NMR spectra was analyzed for chain end populations. Very few vinyls were observed, 0.005%, and vinylidenes were 0.030%. The residual unsaturated double bonds from the norbornadienes were 0.062%. Since the product from the first reaction was similar to the polymer of Example 4, an estimated 0.17% of the norbornadienes incorporated in the first polymerization reaction have reacted in the second polymerization to make branch blocks. The composition of this reactor blend was estimated by fitting Markovian probabilities to the six peaks between 0.8 and 1.7 ppm of the spectra. The blend consisted of 34.5% isotactic polypropylene and 65.5% of ethylene-propylene copolymer containing 51.0% propylene.

The differential scanning calorimetry data, DSC, showed on the second heating a glass transition temperature of −49.2° C. for the ethylene-propylene chains and a melting point of 142.0° C. for the isotactic polypropylene chains. The percent crystallinity can be calculated by dividing the measured heat of fusion from the isotactic polypropylene melting peak in the DSC by the heat of fusion for 100% polypropylene (189 J/g) obtained from the Polymer Handbook, Fourth Edition, published by John Wiley and Sons, New York 1999. The measured heat of fusion was 16.3 J/g, so the blend is 8.6% crystalline.

Examples 7 to 9

A series of copolymers of ethylene, propylene, and norbornadiene were produced using the conditions summarized in Table 3 below. The catalyst system comprised a rac-dimethylsilylbis(2-methyl,4-phenyl indenyl)zirconium dimethyl (cat 1) precatalyst activated by dimethylanilinium tetra(perfluoronaphthyl)borate (act 1) dissolved in toluene. 1.0 ml of one molar tri(isobutyl)aluminum solution in hexane and 0.50, 1.00, and 2.00 mL of norbornadiene were dissolved in dry, air free toluene in the drybox. The scavenger/diene solution was then cannellated into the reactor. 100 ml of toluene and 100 ml of propylene were added using a sight glass. The reactor was stabilized at 70° C. and the head pressure for ethylene was set at 150 psig higher than the reactor pressure. At the start of the reaction the ethylene feed was opened and the reactor pressure rose to the ethylene head pressure. During the reaction, ethylene flowed into the reactor under the control of a pressure regulator to maintain a constant pressure. The catalyst solution was pumped into the reactor through an ISCO HPLC pump at a rate of 1.5 ml/min. Reaction was continued until 20 liters (STP) of ethylene had been added, as measured by a Brooks flow meter. After the listed times the catalyst fed was stopped, the reactor was cooled to below 50° C. and the reactor contents were drained through the bottom valve of the autoclave. Polymers were precipitated using methanol, redissolved a second time in 100° C. toluene, and reprecipitated. The solids were filtered and placed in an 80° C. vacuum oven overnight to remove the residual volatiles.

TABLE 3

| Example | 7 | 8 | 9 |
|---|---|---|---|
| Rxrl T (° C.) | 72.1 | 71.8 | 71.7 |
| C3 = (ml) | 100 | 100 | 100 |
| C2 = (psig) | 150 | 150 | 150 |
| Norbornadiene (ml) | 0.50 | 1.00 | 2.00 |

TABLE 3-continued

| Example | 7 | 8 | 9 |
|---|---|---|---|
| Toluene (ml) | 115 | 115 | 115 |
| Cat1 (mg) | 18 | 18 | 18 |
| Act1 (mg) | 37.5 | 37.5 | 37.5 |
| TIBAL (ml) | 1.0 | 1.0 | 10.0 |
| Total Cat Sol'n (ml) | 125 | 125 | 125 |
| Cat Sol'n Used (ml) | 24.0 | 16.5 | 17.2 |
| Reaction time (min) | 16 | 11.0 | 11.5 |
| Reactor Press (psig) | 419 | 395 | 383 |
| Yield (g) | 15.0 | 19.6 | 12.5 |

TABLE 4

| Example | 7 | 8 | 9 |
|---|---|---|---|
| 1H-NMR: | | | |
| vinyls | 0.00% | 0.022% | .010% |
| vinylidenes | .088% | 0.050% | .059% |
| UNBD | .068% | 0.084% | .11% |
| SEC: | | | |
| LS-Mn | 30K | 33K | 35K |
| LS-Mw | 103K | 108K | 130K |
| LS-Mz | 350K | 398K | 445K |
| g' (vis. Avg) | 1.347 | 1.328 | 1.252 |
| g' (Z Avg.) | 1.215 | 1.071 | 1.007 |

Examples 10 to 20

In Examples 10 to 20, a series of in-reactor blends were synthesized using slightly different reactor conditions. Ethylene/propylene/norbornadiene copolymers were made in the first polymerization reaction, and isotactic polypropylene was made in the second reaction. The catalyst solutions comprised rac-dimethylsilylbis(2-methyl,4-phenylindenyl)zirconium dimethyl (cat 1) precatalyst and dimethylanilinium tetra (heptafluoronaphthyl)borate (act 1) activator dissolved in toluene. The same catalyst solution was used for both reactions, and the amounts are given in Table 5. The scavenger used in these Examples was a 1 molar solution of triisobutylaluminum, TIBAL, in hexane. The scavenger and norbornadiene were dissolved a drybox in 10-20 ml of toluene. They were then cannellated into the reactor. The toluene and liquid propylene were added using sight glasses. Ethylene head pressure is set to be higher than the vapor pressure of the toluene, propylene, and norbornadiene equilibrated in the reactor when it reaches the run temperature. The ethylene pressures listed in Table 5 are the partial pressures of ethylene added in excess to the pressures of the toluene, norbornadiene, and propylene. Once the ethylene flow is started, the reactor pressure jumps up to the ethylene head pressure. As the ethylene and propylene insert into the copolymers of reaction 1, the pressure is maintained by the continuous addition of ethylene through a pressure regulator. The monomer concentrations in reaction 1 gradually get slightly more ethylene rich, since the propylene is consumed and is replaced with ethylene. After the addition of about 20 liters (STP) of ethylene, the catalyst and ethylene feeds are stopped. The reactor is cooled below 40° C. and vented to below 3-5 psig. At these pressures nearly all the ethylene and propylene are removed from the reactor.

After sealing the reactor again, additional solvent is added using the sight glass. In Example 10 an additional 100 ml of liquid propylene is added through a Micromotion Flowmeter before the second reaction and the reactor is heated to 100° C. In the other Examples the reactor is heated to 100° C. without the addition of propylene. Typical, reactor pressures at the start of the second reaction are 35 psig. The head pressure of the propylene feed tank is set at 125 to 200 psi. A needle valve was installed on the propylene feed line between the feed tank and reactor to slow the flow rate of the propylene. The propylene feed was totalized by the Micromotion flow meter and the total is reported in Table 5. The letter b after the volume means the propylene was slowly bled into the reactor. Ideally, the propylene concentrations during the second reactions are very low, because the monomers are being bled into the reactor. Ideally, the rate of insertion of propylene into the polymers of reaction 2 is high enough that the propylene is consumed as it bleeds into the reactor. However, in every case the propylene feed rates eventually were too high and the reactor pressure reaches the propylene feed tank's head pressure, the final pressures in Table 5. In the first reactions the catalyst solutions were fed at a rate of 1.5 ml/min. In the second reaction the feed rate was 10-30 ml/min.

weights. All previously known linear ethylene-propylene copolymers have intrinsic viscosities between those for an isotactic polypropylene or a polyethylene with the same molecular weight. Linear ethylene-propylene copolymers are expected to have g' values greater than one. The reactor blends of these Examples have g' values less than one, because they are highly branched to give more compact chains and lower viscosities.

Figure 4:
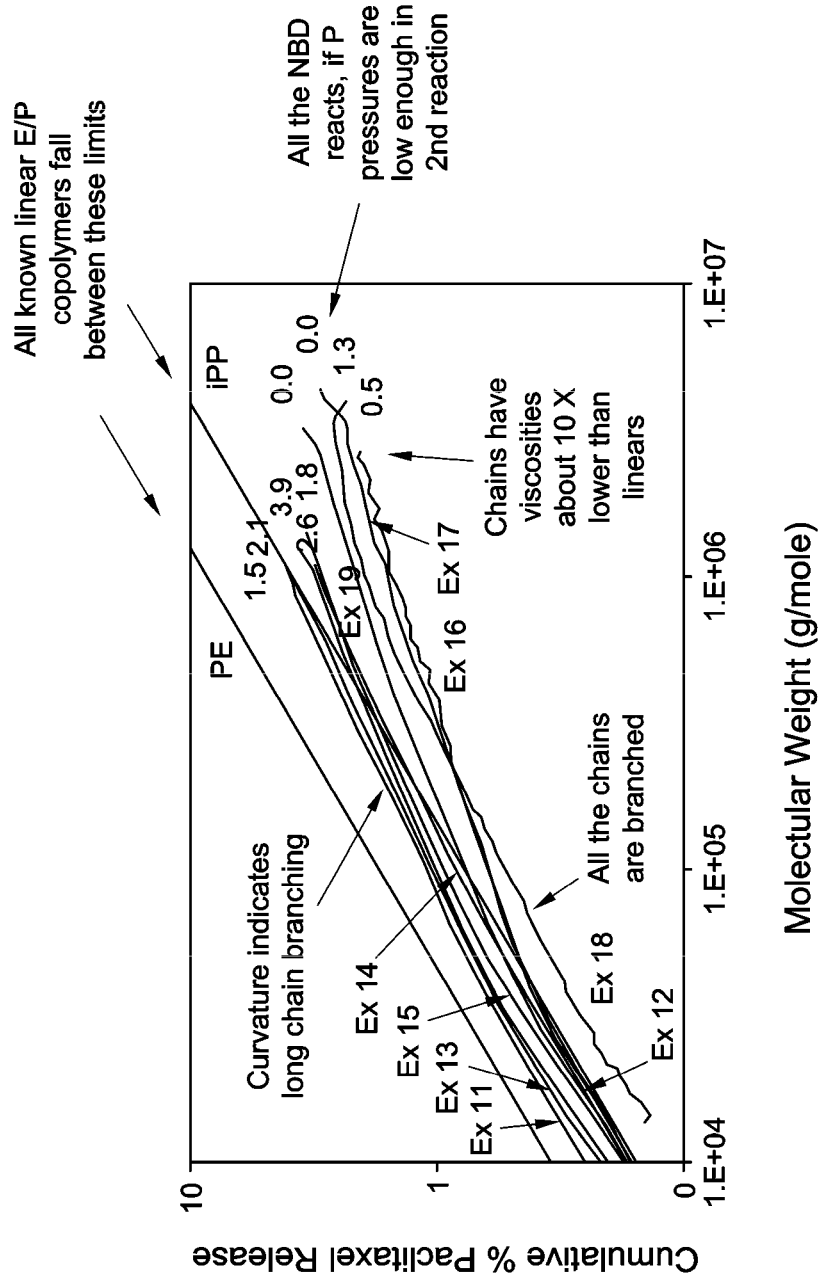
FIG. 4 plots the intrinsic viscosity versus molecular weight from the SEC-DRI-LS-VISC experiment for certain of the reactor blends of isotactic polypropylene and ethylene-propylene-norbornadiene copolymer produced in Examples 10 to 20.

These data are plotted in FIG. 4. The lower straight line is the measured dependence of isotactic polypropylene's intrinsic viscosity on molecular weight. The higher straight line is the expected dependence of polyethylene's intrinsic viscosity on molecular weight. The intrinsic viscosities of all known linear ethylene-propylene copolymers fall between these two lines. It can be seen that at low molecular weights Examples 11-16 all fall between these extremes. However, at higher molecular weights the probability of branching increases,

TABLE 5

| Example Number | 10 | 11 | 12 | 13 | 14 | 15 |
|---|---|---|---|---|---|---|
| Rxn 1 Toluene (ml) | 100 | 100 | 100 | 118 | 120 | 70 |
| Rxn 1 Propylene (ml) | 100 | 100 | 100 | 100 | 100 | 100 |
| Rxn 1 Ethylene (Δpsi) | 150 | 150 | 150 | 150 | 150 | 150 |
| Norbornadiene (ml) | 1 | 2 | 2 | 2 | 2 | 2 |
| Scavenger Amt (ml) | 2 | 1 | 2 | 1 | 1 | 1 |
| Cat Soln Toluene (ml) | 125 | 125 | 125 | 125 | 125 | 125 |
| Cat Amount (mg) | 10 | 30 | 20.9 | 36 | 29 | 26 |
| Activator Amt (mg) | 20 | 60 | 40 | 78 | 59 | 53 |
| ml of Cat Soln In Rxn 1 | 14.5 | 21.0 | 20 | 19.5 | 15 | 15 |
| Rxn 1 Temp (° C.) | 71.9 | 71.7 | 72 | 72 | 71.8 | 72 |
| Rxn 1 Pressure (psig) | 342 | 347 | 347 | 330 | 357 | 400 |
| Press After Vent (psig) | 5 | 3 | 5 | 3 | 5 | 5 |
| Rxn 2 Toluene (ml) | 100 | 100 | 100 | 100 | 100 | 50 |
| Rxn 2 Propylene (ml) | 100 | 100b | 100b | 63b | 100b | 39b |
| Rxn 2 Temp (° C.) | 100 | 101 | 100 | 100 | 101 | 100 |
| ml of Cat Soln in Rxn 2 | 25 | 95 | | 109.5 | 70 | 110 |
| Rxn 2 Init. Press (psig) | 233.4 | 29.9 | | 35 | 35 | 38.3 |
| Rxn 2 Final Press (psig) | 168.1 | 160 | | 200 | 105 | 150 |
| Length of Rxn 1 (min) | 20 | 9 | | 43 | 35 | 87 |
| Yield (g) | 40.2 | 28.0 | 18.45 | 8.92 | 38.90 | 42.03 |

| Example Number | 16 | 17 | 18 | 19 | 20 |
|---|---|---|---|---|---|
| Rxn 1 Toluene (ml) | 70 | 120 | 120 | 120 | 115 |
| Rxn 1 Propylene (ml) | 100 | 100 | 100 | 100 | 100 |
| Rxn 1 Ethylene (Δpsi) | 150 | 150 | 150 | 150 | 150 |
| Norbornadiene (ml) | 2 | 2 | 2 | 2 | 0.5 |
| Scavenger Amt (ml) | 1 | 1 | 1 | 1 | 1 |
| Cat Soln Toluene (ml) | 125 | 125 | 125 | 125 | 125 |
| Cat Amount (mg) | 29 | 35 | 35 | 25 | 27 |
| Activator Amt (mg) | 58 | 70 | 69 | 50 | 54 |
| ml of Cat Soln In Rxn 1 | 15 | 22.5 | 12 | 15 | 15 |
| Rxn 1 Temp (° C.) | 71.7 | 72 | 71.7 | 71.8 | 58 |
| Rxn 1 Pressure (psig) | 380 | 333 | 378 | 292 | 322 |
| Press after vent (psig) | 5 | 5 | 5 | 5 | 4 |
| Rxn 2 Toluene (ml) | 100 | 100 | 100 | 100 | 100 |
| Rxn 2 Propylene (ml) | 100b | 100b | 75b | 100b | 39b |
| Rxn 2 Temp (° C.) | 101 | 101.8 | 100.8 | 101 | 100 |
| ml of Cat Soln in Rxn 2 | 110 | 102.5 | 113 | 110 | 110 |
| Rxn 2 Init. Press (psig) | 35 | 36.4 | 30 | 28.3 | 97.1 |
| Rxn 2 Final Press (psig) | 150 | 149 | 143 | 141 | 157 |
| Length of Rxn 2 (min) | 15 | 33 | 43 | 35 | 60 |
| Yield | | 83.8 | 66.9 | 67.5 | 50.5 |

Characterization data for these polymers is presented in Table 6. The size exclusion chromatography, SEC-DRI-LS-VISC, data strongly suggest very high levels of branching when the propylene is bled into the second polymerization. The values of g'(visc. avg.) and g'(Z avg.) both become significantly less than one for Examples 16-20. This means that these reactor blends of ethylene-propylene copolymers and isotactic polypropylene have significantly lower intrinsic viscosities than isotactic polypropylenes of the same molecular since more norbornadienes should be incorporated into longer chains. The intrinsic viscosity versus MW curves of these Examples bend downward, as the polymers become branched. Finally, at high molecular weights, Examples 14-19 have intrinsic viscosities below that of isotactic polypropylene. Examples 16-18 have branches at all molecular weights and always have intrinsic viscosities at or below isotactic polypropylene. This level of branching has never been reported previously.

Figure 5:
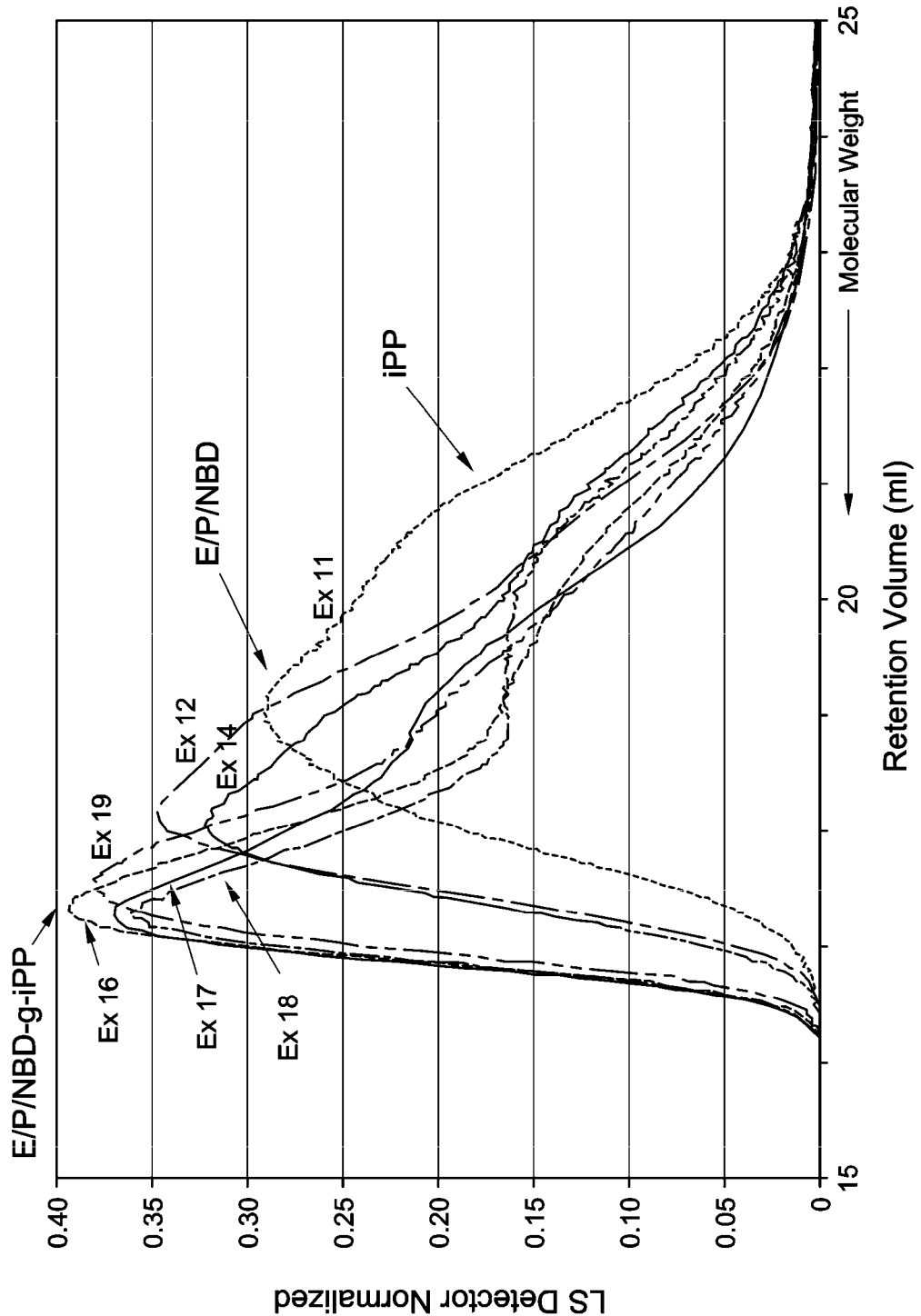
FIG. 5 shows the light scattering detector chromatogram for certain of the reactor blends of isotactic polypropylene and ethylene-propylene-norbornadiene copolymer produced in Examples 10 to 20.

The light scattering chromatograms for these Examples are plotted in FIG. 5. There are three peaks (shoulders) visible in these data. The shoulder at retention volumes of 20-21 ml is assigned to the unbranched isotactic polypropylene made in the second polymerization. The peaks and shoulders from 19-20 ml are due to unbranched ethylene-propylene-norbornadiene copolymers made in the first polymerization reaction. The peaks at retention volumes of 17-18 ml are the branch blocks that form when the norbornadienes incorporated in the first polymerization are subsequently incorporated a second time in the second polymerization. Examples 11-14 contain lower levels of branches and only have a trailing amount of branch blocks consistent with their intrinsic viscosity curves. Examples 16-19 are mostly branch block copolymers according to these chromatograms.

The two molecular weight distributions, Mw/Mn and Mz/Mw, are calculated in Table 6. For random copolymers synthesized by metallocenes, one would expect these distributions to be 2. However, since these are reactor blends, the distributions are broader. For Examples 10, 11, and 13, that have fewer branches based upon high g' values, the molecular weight distributions are in the range of 2-5. As more branches are made and g' values decrease, the molecular weight distributions broaden until for Examples 16-20 distributions from 8 to 16 are observed. These broad molecular weights are another indication of the formation of high molecular weight branch block copolymers.

$^1$HNMR data are also presented in Table 6. From analysis of the double bonds in the spectra, the concentrations of vinyl and vinylidene chain ends and the concentration of residual double bonds in the norbornadiene can be calculated. Example 10 used only 1 ml of norbornadiene in the first polymerization and has a lower amount of unsaturated NBDs in the $^1$HNMR spectrum. Examples 11 and 13 seem to have very little incorporation of the norbornadiene in the second polymerization, because their g' values are well above one. It, therefore, appears that about 0.2% norbornadiene double bonds are left unreacted in the ethylene-propylene after the first polymerization reaction. This percentage is similar to Example 9, where the ethylene-propylene-norbornadiene copolymers were made, but no second polymerization was carried out.

It can be seen from the chain ends that many more reactive sites can be introduced into the ethylene-propylene chains using the norbornadiene than are available as vinyl groups at the chain ends. In Example 11 and 13 there are 13 and 21 times more norbornadiene double bonds than vinyl chain ends. This is why the present reactor blends have much higher branching levels than have been reported by researchers trying to insert vinyl-terminated macromers. In Examples 17, 19, and 20 no residual double bonds from norbornadienes are left in the reactor blends, because they have completely reacted to form branched blocks. Assuming that the 0.2% of norbornadiene unsaturations after the first reaction estimate is valid, these three blends must contain branch concentrations in the vicinity of 0.2%. In FIG. 4 these concentrations of norbornadiene double bonds left in the reactor blends is given at the end of the intrinsic viscosity versus molecular weight curves. It can easily be seen that Examples 16 through 19, that contain few residual norbornadiene double bonds, have intrinsic viscosities less than or equal to isotactic polypropylene at all molecular weights. These polymers are so branched that all the chains in the blends have at least one branch.

The compositions of the reactor blends were measured by fitting Markovian probabilities to the six major aliphatic peaks in the $^1$HNMR spectrum. In these fits the norbornadiene and possible branches are ignored, since they are present in less than 1% of the carbons. The compositions vary over a wide range: from 14.4 to 70.7 mole % isotactic polypropylene and ethylene-propylene copolymers containing from 42.8 to 59.6 mole % propylene. Compositions containing higher levels of isotactic polypropylene made in the second polymerization reaction seem to have slightly higher levels of branching. This occurs because the longer the catalysts are polymerizing propylene, the more likely the residual double bonds of the norbornadiene will be incorporated as well. With this range of isotactic polypropylene contents, some of these reactor blends are hard with isotactic polypropylene as the continuous phase, and some are soft with ethylene-propylene copolymers as the continuous phase.

Differential scanning calorimetry (DSC) data are presented in Table 6. For most of the Examples, a glass transition temperature of −45 to −57° C. is seen from the ethylene-propylene-norbornadiene copolymers made in the first polymerization reaction. A melting point for most of the Examples was also observed from 128 to 146° C. from the isotactic polypropylene made in the second reaction. In Examples 12 and 13 no melting point for isotactic polypropylene was observed, suggesting that too little of the second reaction was carried out. This is probably why these two examples do not have much branching as indicated by their g' values. The crystallinities of the reactor blends ranged from 5 to 21%.

TABLE 6

| Example Number | 10 | 11 | 12 | 13 | 14 | 15 |
|---|---|---|---|---|---|---|
| §-DRI-LS-VISC: | | | | | | |
| LS-Mn | 33K | 17K | 15K | 21K | 16K | 20K |
| LS-Mw | 72K | 58K | 93K | 56K | 81K | 68K |
| Ls-Mz | 213K | 232K | 413K | 181K | 462K | 285K |
| g' (visc avg.) | 1.129 | 1.342 | 1.199 | 1.476 | 1.083 | 1.047 |
| g' (Z avg.) | 1.125 | 1.17 | 0.968 | 1.292 | 0.866 | 0.926 |
| Mw/Mn | 2.18 | 3.41 | 6.20 | 2.67 | 5.06 | 3.40 |
| Mz/Mw | 2.96 | 4.00 | 4.44 | 5.03 | 5.70 | 4.19 |
| $^1$H-NMR: | | | | | | |
| vinyls | .055% | .016% | .029% | .007% | .037% | .019% |
| vinylidenes | .049% | .086% | .083% | .069% | .074% | .054% |
| UNBDs | .055% | .21% | .39% | .15% | .18% | .26% |
| iPP | 59.5% | 22.0% | 14.4% | 37.9% | 37.9% | 53.3% |
| EP | 40.5% | 78.0% | 85.6% | 62.1% | 62.1% | 46.7% |
| P in the EP | 48.3% | 42.8% | 44.9% | 48.9% | 48.9% | 46.6% |

TABLE 6-continued

| DSC: | | | | | | |
|---|---|---|---|---|---|---|
| $1^{st}$ Tg (° C.) | −49.4 | −56.1 | −50.24 | −55.23 | −55.30 | −55.62 |
| $2^{nd}$ Tg (° C.) | −8.73 | | | | | |
| Tm (° C.) | 145.9 | 130.1 | | 135.15 | 143.34 | |
| Heat of Fusion (J/g) | 40.04 | 12.28 | | 21.71 | 37.64 | |
| % Crystallinity | 21.1% | 6.50% | | 11.5% | 19.9% | |

| Example Number | 16 | 17 | 18 | 19 | 20 |
|---|---|---|---|---|---|
| SEC-DRI-LS-VISC: | | | | | |
| LS-Mn | 16K | 25K | 17K | 15K | 27K |
| LS-Mw | 136K | 182K | 108K | 125K | 325K |
| LS-Mz | 1513K | 1440K | 1778K | 1005K | 2374K |
| g' (visc avg.) | 0.631 | 0.569 | 0.672 | 0.807 | 0.697 |
| g' (Z avg.) | 0.330 | 0.384 | 0.288 | 0.523 | 0.485 |
| Mw/Mn | 8.50 | 7.4 | 6.35 | 8.33 | 12.04 |
| Mz/Mn | 11.13 | 7.91 | 16.46 | 8.04 | 7.30 |
| $^1$H-NMR: | | | | | |
| vinyls | .038% | .13% | .028% | .030% | .055% |
| vinylidenes | .061% | .13% | .055% | .030% | .067% |
| UNBDs | .13% | 0.0% | .048% | 0.0% | 0.0% |
| iPP | 61.5% | 70.69% | 59.1% | 59.3% | 40.2% |
| EP | 38.5% | 29.4% | 40.9% | 40.7% | 59.8% |
| P in the EP | 46.2% | 59.6% | 46.4% | 53.8% | 45.4% |
| DSC: | | | | | |
| Tg (° C.) | | −52.41 | −54.77 | −44.95 | −56.22 |
| Tm (° C.) | 128.40 | 128.06 | 130.95 | 132.71 | 102.28 |
| Heat of Fusion (J/g) | 30.17 | 28.30 | 32.94 | 9.78 | 11.81 |
| % Crystallinity | 16.0% | 15.0% | 17.4% | 5.2% | 6.3% |

Small angle oscillatory shear data was collected at 190° C. for some of these Examples over the range of frequencies from 0.01 s$^{-1}$ to 100 s$^{-1}$. According to Garcia-Franco et al. (Macromolecules 2001, 34, No. 10, 3115-3117), the plateau in a plot of loss angle versus frequency will shift to lower loss angles δ when the amount of long chain branching occurring in the polymer sample increases. This effect is observed in FIG. 6. All of the polymers of these Examples are highly branched and exhibit gel-like behavior. Their loss angles are almost independent of frequency and have critical relaxation exponents of 0.796, 0.839, 0.644, 0.808, 0.505, and 0.118 for Examples 5, 11, 14, 10, 20, and 17, respectively. According to this rheological test, Example 17 is the most highly branched because its critical relaxation exponent is lowest. This is one of the reactor blends that had intrinsic viscosities less than or equal to isotactic polypropylene for all molecular weights in FIG. 4.

Figure 7:
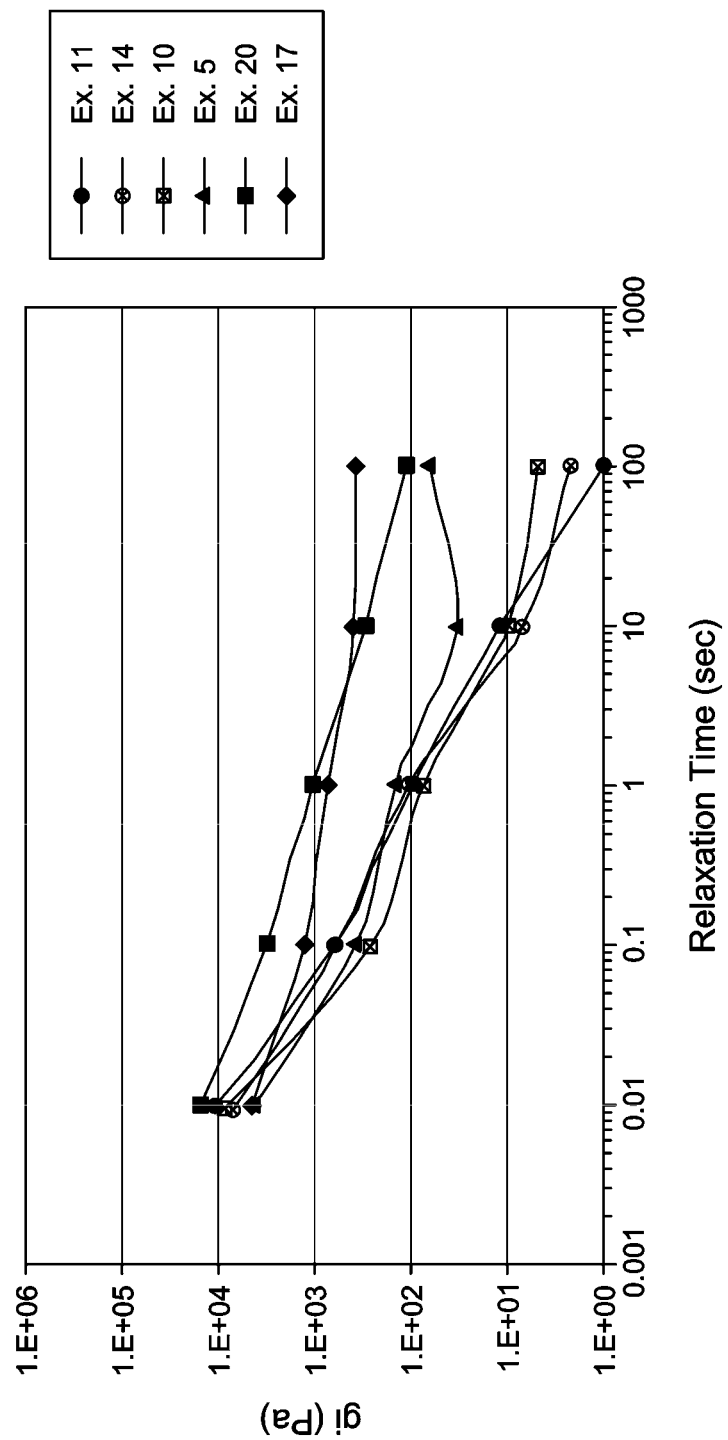
FIG. 7 plots the relaxation spectra calculated from small angle oscillatory shear data for the reactor blends of isotactic polypropylene and ethylene-propylene-norbornadiene produced in Example 5 and certain of Examples 10 to 20.

Generalized Maxwell models were fit to the small angle oscillatory shear data with relaxation times of 0.01, 0.1, 1, 10, and 100 seconds. These relaxation spectra are plotted in FIG. 7. As more cross-products form in the second polymerization reaction, more chains with long relaxation times are made. These slowly relaxing chains are branched and have higher molecular weights than the isotactic polypropylene or ethylene-propylene-norbornadiene chains present in the blend. They show up in the relaxation spectra as a flattening of the distribution versus relaxation time. In FIG. 7, the lightly branched Examples 10, 11, and 14 all have relatively low amounts of chains with relaxation times of 100 s. The highly branched Examples 5, 20, and 17 have high amounts of chains with a relaxation time of 100 seconds. For Examples 11, 10, 14, 5, 20, and 17 the values of g (100 s), the chains with relaxation times of 100 seconds, are 1, 5, 2.25, 63, 111, and 373. This is another useful measure of the amount of branching in these reactor blends. Rather than using the $g_i$'s as the relaxation spectra, many researchers also use $\eta_i$'s, which are simply $g_i^* \lambda_i$ where $\lambda_i$ is the relaxation time. The sum up to the zero shear viscosity, $\eta_0$. A relaxation fraction can be calculated by dividing the $\eta_i$ by the zero shear viscosity, $\eta_0$. For Examples 11, 10, 14, 5, 20, and 17, the viscosity fractions are 0.206, 0.639, 0.428, 0.916, 0.707, and 0.885, respectively.

Figure 8:
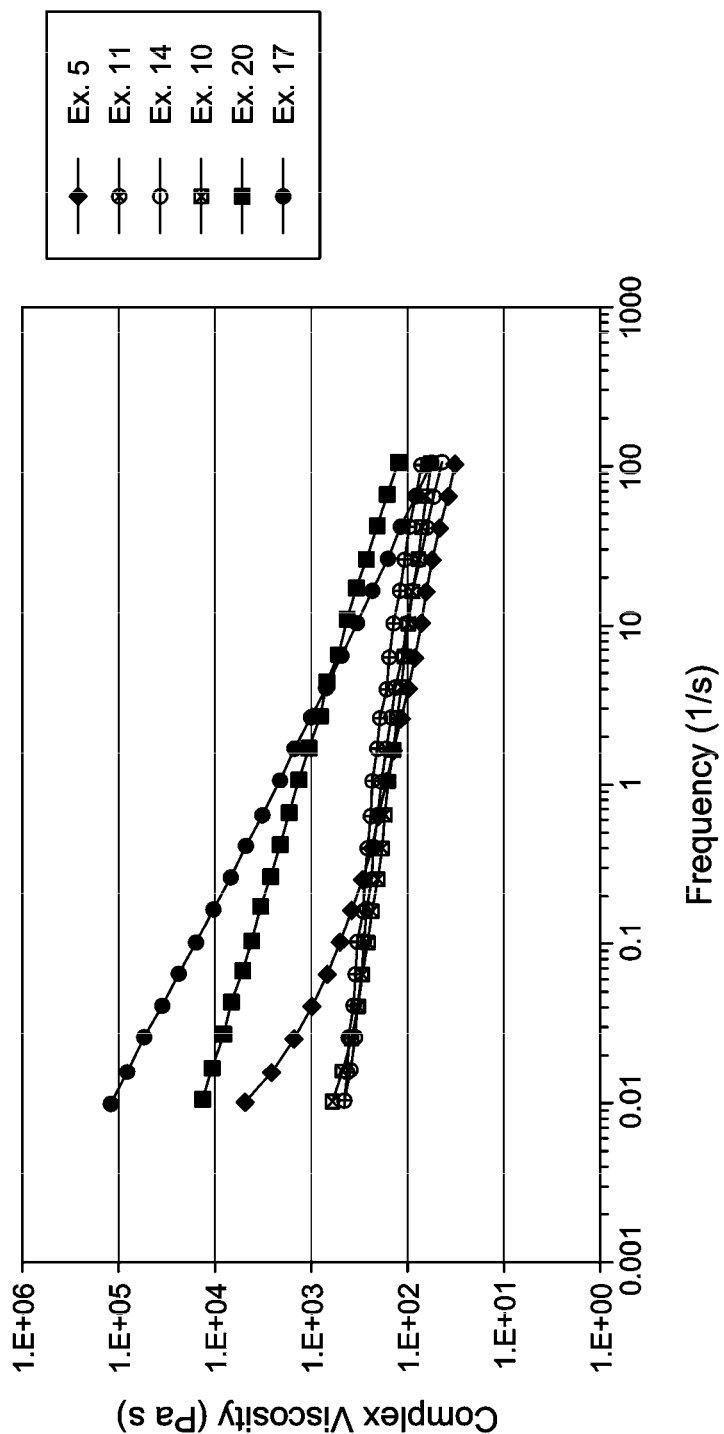
FIG. 8 plots the dynamic viscosity versus frequency from small angle oscillatory shear data for the reactor blends of isotactic polypropylene and ethylene-propylene-norbornadiene produced in Example 5 and certain of Examples 10 to 20.

Large amounts of chains with long relaxation times lead to high zero shear rate viscosities and to high shear thinning. The dynamic viscosity is plotted versus frequency in FIG. 8. All these Examples exhibit shear thinning, but Example 17 is the most shear thinning. To quantify this effect, the slope of these curves can be estimated using the dynamic modulus values at frequencies of 0.01 and 100 s$^{-1}$. These secant slopes of the log($\eta^*$) versus log($\omega$) curves are negative with larger values for more shear thinning. The secant slopes for Examples 11, 10, 14, 5, 20 and 17 are −0.193, −0.254, −0.247, −0.544, −0.504 and −0.827, respectively. Once again Example 17 is selected as the most highly branched sample.

Examples 21 to 26

These examples demonstrate the use of series reactors operated in a continuous stirred-tank solution process employing rac-dimethylsilylbis(2-methyl-4-phenylindenyl) zirconium dimethyl catalyst to produce a propylene/1,9-decadiene (P/1,9-DD) macromonomer in the first reactor and the same catalyst to produce an propylene/ethylene copolymer in the second reactor. Some of the propylene/1,9-decadiene macromonomer was incorporated onto the propylene/ethylene copolymer chain to produce a branched block composition.

The first reactor was 0.5-liter and the second reactor was 1-liter; both of them were stainless steel autoclave reactors and were equipped with a stirrer, a water-cooling/steam-heating element with a temperature controller, and a pressure controller. Solvents, monomers (ethylene, propylene and 1,9-decadiene) were first purified by passing through a threecolumn purification system. Purification columns were regenerated periodically whenever there was evidence of lower activity of polymerization.

The solvent feed to the reactors was measured by a mass-flow meter. A Pulsa feed pump controlled the solvent flow rate and increased the solvent pressure to the reactors. The compressed, liquefied propylene feed was measured by a mass flow meter and the flow was controlled by a Pulsa feed pump. 1,9-decadiene flow rate was metered through a Quantim flow controller. The solvent, monomers were fed into a manifold first. The mixture of solvent and monomers were then chilled to about −15° C. by passing through a chiller prior to feeding into the reactor through a single tube.

The metallocene catalyst was preactivated with dimethyl anilinium tetrakis(heptafluoro-2-naphthyl)borate at a molar ratio of 1:1 in 900 ml of toluene. The catalyst solution was kept in an inert atmosphere with <1.5 ppm water content and fed into reactors by metering pumps. Tri-n-octylaluminum (TNOA) solution was used as a scavenger.

The reactors were first cleaned by continuously pumping solvent (e.g., isohexane) and scavenger through the reactor system for at least one hour at a maximum allowed temperature (about 150° C.). After cleaning, the reactors were heated/cooled to the desired temperature using water/steam mixture flowing through the reactor jacket and controlled at a set pressure with controlled solvent flow. Monomers and catalyst solutions were then fed into the reactor. An automatic temperature control system was used to control and to maintain the reactors at set temperatures. Onset of polymerization activity was determined by observations of a viscous product and lower temperature of water-steam mixture. Once the activity was established and system reached steady state, the reactors were lined out by continuing operating the system under the established condition for a time period of at least five times of mean residence time prior to sample collection. The resulting mixture from the second reactor, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g.

Propylene, 1,9-decadiene, isohexane, catalyst solution and scavenger solution were all fed into the first reactor. The content of the first reactor flowed into the second reactor. Ethylene was fed into the second reactor through a Brookfield mass flow controller. The detailed reaction conditions and polymer properties are listed in Table 7.

TABLE 7

| Example | 21 | 22 | 23 | 24 | 25 | 26 |
|---|---|---|---|---|---|---|
| Polymerization temperature in $1^{st}$ reactor (° C.) | 100 | 100 | 100 | 100 | 100 | 100 |
| Propylene feed rate to $1^{st}$ reactor (g/min) | 14 | 14 | 14 | 14 | 14 | 14 |
| 1,9 decadiene feed rate to $1^{st}$ reactor (ml/min) | 0.04878 | 0.04878 | 0.04878 | 0.04878 | 0.04878 | 0.04878 |
| Isohexane feed rate to $1^{st}$ reactor (ml/min) | 80 | 80 | 80 | 80 | 80 | 80 |
| Catalyst feed rate to $1^{st}$ reactor (mole/min) | 2.13E−08 | 2.13E−08 | 4.28E−08 | 4.28E−08 | 2.69E−08 | 2.69E−08 |
| Polymerization temperature in $2^{nd}$ reactor (° C.) | 80 | 80 | 80 | 80 | 80 | 80 |
| Ethylene feed rate to $2^{nd}$ reactor (SLPM) | 2 | 2 | 0.5 | 0.5 | 0.5 | 2 |
| Catalyst feed rate to $2^{nd}$ reactor (mole/min) | 1.28E−08 | 1.06E−08 | 2.06E−08 | | | |
| Yield (g/min) | 14.15 | 14.27 | 12.29 | 12.67 | 10.1 | 12.58 |
| Conversion (%) | 87.04 | 87.75 | 84.41 | 86.99 | 69.33 | 77.39 |
| DSC: | | | | | | |
| Tc (° C.) | 81.8 | 88.1 | 90.1 | 92.6 | 83.1 | 91.9 |
| Tm (° C.) | 154.1 | 154.6 | 152.0 | 153.1 | 152.3 | 153.2 |
| Tg (° C.) | −30.9 | −31.9 | −23.1 | −21.1 | −21.2 | −30.8 |
| Heat of Fusion (J/g) | 14.6 | 21.8 | 63.5 | 66.5 | 63.8 | 13.4 |
| % crystallinity | 7.7% | 11.5% | 33.6% | 35.2% | 33.8% | 7.1% |
| Tc from a secondary crystallization peak (° C.) | | | | | | 30.2 |
| Tm from a secondary melting peak (° C.) | 48.6 | 40.4 | 99.0 | 98.2 | 98.3 | 55.8 |
| Heat of fusion from a secondary melting peak (J/g) | 8.3 | 6.3 | | | | 6.7 |
| % crystallinity | 4.4% | 3.4% | | | | |
| FTIR: | | | | | | |
| Ethylene (wt %) | | | 6.45 | 6.42 | 6.38 | 12.86 |
| MFR (dg/min) | | | 592.2 | 475.2 | 204.8 | 462.7 |
| SEC-DRI-LS-VISC: | | | | | | |
| Mn_LS (kg/mol) | | | 38.0 | 41.0 | 51.6 | 38.8 |
| Mw_LS (kg/mol) | | | 84.9 | 93.7 | 115.8 | 85.5 |
| Mz_LS (kg/mol) | | | 156.6 | 173.0 | 226.0 | 157.1 |
| g'vis | | | 0.853 | 0.852 | 0.862 | 0.859 |
| g' zave | | | 0.805 | 0.803 | 0.797 | 0.812 |

The molecular weights of these reactor blends are moderate, 84,900-115,800, but their melt flow rates, MFRs, are very high 204.8-592.2 due to extensive branching. The g' values from the SEC-DRI-LS-VISC experiment are calculated for these Examples using the intrinsic viscosity versus molecular weight curve for a linear ethylene-propylene copolymer with the same composition. The values less than one show that these polymers are branched.

Example 27

This Example was also made in the continuous solution process used for Examples 21-26. The catalyst was introduced into the first stirred tank reactor and was subsequently used to make polymer in the second polymerization reactor. The catalyst was rac-dimethylsilylbis(2-methyl-4-carbazol-indenyl)zirconium dimethyl activated by N,N-dimethyla-nilinium tetrakis(pentafluorophenyl)borate. The diene was 1,9-decadiene. An ethylene-propylene-1,9-decadiene copolymer was targeted in the first reaction and isotactic polypropylene was targeted in the second reaction. Reactor conditions and blend properties are presented in Table 8.

TABLE 8

| Example | 27 |
|---|---|
| Polymerization temperature in $1^{st}$ (° C.) | 80 |
| Propylene feed rate to $1^{st}$ reactor (g/min) | 14 |
| Ethylene feed rate to $1^{st}$ reactor (SLPM) | 2 |
| 1,9 decadiene feed rate to $1^{st}$ reactor (ml/min) | 0.1429 |
| Isohexane feed rate to $1^{st}$ reactor (ml/min) | 80 |
| Catalyst feed rate to $1^{st}$ reactor (mole/min) | 1.2E−07 |
| Polymerization temperature $2^{nd}$ reactor (° C.) | 100 |
| Propylene feed rate to $2^{nd}$ reactor (g/min) | 10.2 |
| Yield (g/min) | 23.1 |
| Conversion (%) | 87.38 |
| DSC | |
| Tc (° C.) | 85.6 |
| Tm (° C.) | 121.6 |
| Tg (° C.) | −22.3 |
| Heat of fusion (J/g) | 59.3 |
| % crystallinity | 31.4% |
| FTIR | |
| Ethylene (wt %) | 7.05 |
| MFR (dg/min) | 67.05 |
| SEC-DRI-LS-VISC: | |
| Mn_LS (kg/mol) | 94.1 |
| Mw_LS (kg/mol) | 562.8 |
| Mz_LS (kg/mol) | 4456.2 |
| g'vis | 0.375 |
| g' zave | 0.222 |
| Mw/Mn | 5.98 |
| Mz/Mw | 7.92 |
| Stress @ Yield (MPa) | 16.2 |
| Peak Stress (MPa) | 21.7 |
| Stress @ break (MPa) | 21.5 |
| Strain At Break (%) | 721.7 |
| Modulus at 100% (MPa) | 12.04 |

The relatively low melting point for the isotactic polypropylene, 121° C., suggests that ethylene from the first reaction was not completely consumed and flowed into the second polymerization reactor. The molecular weight distributions, Mw/Mn and Mz/Mw, are both very high suggesting the presence of a high molecular component, presumably the cross-product of the two polymers in the reactor blend. The SEC-DRI-LS-VISC g' values were compared with the intrinsic viscosity versus molecular weight curve for a linear propylene-ethylene copolymer with 7.05 wt % ethylene. This intrinsic viscosity versus molecular weight curve is very close to the curve for pure isotactic polypropylene. The very low g' values of 0.375 and 0.222 show that the intrinsic viscosity of the reactor blend is much lower than the linear polymers because it is highly branched.

Notice that the stress at break is 21.5 MPa compared with 16.2 MPa for the stress at the yield point. This increased stress after yielding is due to strain hardening as the branched chains are stretched between crystalline domains and branch points. The strain at break is 721%, which is typical of an ethylene-propylene elastomer. The strain hardening is typical of a crosslinked elastomer and shows the presence of extensive grafting and long chain branches.

Small angle oscillatory shear data were collected at 190° C. for this Example. The plot of the loss angle versus frequency is substantially below 90 degrees, indicating extensive branching. The loss angle is relatively independent of frequency and varies between 73 and 51 degrees as the frequency changes from 0.01 to 100 $s^{−1}$. This is gel-like behavior and indicates extensive branching. The critical relaxation exponent for Example 27 is 0.567, which is also typical of highly branched reactor blends. The relaxation spectrum was not fit to these data, since rheology data was collected at only one temperature. The reactor blend is highly shear thinning. The plot of the log(dynamic viscosity) versus log(frequency) has a secant slope of −0.328, which is also proof of extensive branching.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. An in-reactor polymer blend comprising at least 80 mole % of ethylene and from 0.01 to 10 mole % of at least one diene selected from the group consisting of norbornadiene, vinyl norbornene, $C_6$ to $C_{12}$ α,ω-dienes, and mixtures thereof with the balance being an alpha-olefin selected from the group consisting of propylene, butene, pentene, hexene, and mixtures thereof wherein the blend comprises first and second polymers having different crystallinities in which at least the second polymer comprises at least one branch of the first polymer having 8 or more carbon atoms per 10,000 carbon atoms of the in-reactor blend as observed by $^{13}$C NMR, wherein the blend has the following properties:
 (a) a first melting temperature of 70° C. or more and a first Tg of 20° C. or less as determined by Differential Scanning Calorimetry;
 (b) a second melting temperature at least 20° C. different than the first melting temperature as determined by Differential Scanning Calorimetry or a second Tg at least 20° C. different than the first Tg as determined by Differential Scanning Calorimetry;
 (c) at least one branch point per 10,000 carbon atoms, as determined by Carbon 13 NMR; and (d) a critical relaxation exponent, n, of greater than 0 and less or equal to 0.8.

2. The blend of claim 1, wherein said second melting temperature is at least 40° C. and is at least 20° C. less than the first melting temperature.

3. The blend of claim 1, wherein at least 90 wt % of the blend is soluble in refluxing xylene at 138° C.

4. The blend of claim 1, said blend having a viscosity fraction of chains with relaxation times of 100 seconds or more of at least 0.25.

5. The blend of claim 1, said blend having a secant slope for the log(dynamic viscosity) versus log(frequency) curve of less than −0.25.

6. A process for producing an in-reactor polymer blend, the process comprising:
(i) contacting a first monomer composition comprising propylene, from 0.01 to 10 mole % of one or more dienes selected from the group consisting of $C_6$ to $C_{12}$ α,ω-dienes, norbornadiene, vinylnorbornene, and mixtures thereof and optionally ethylene in a first polymerization stage with a metallocene first catalyst which is capable of polymerizing said first monomer composition to produce a first polymer and which is also capable of incorporating said diene into the first polymer such that the product of the first polymerization stage is a propylene-containing first polymer comprising more than one olefinic unsaturation per chain and from 0.1 to 10 mole % diene; and
(ii) contacting at least part of the product of the first polymerization stage with a second monomer composition comprising propylene and optionally ethylene in a second polymerization stage with a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition and wherein the partial pressure of said second monomer composition is kept below 1000 kPa during said second polymerization stage.

7. The process of claim 6, wherein said first polymerization stage is conducted in the presence of hydrogen.

8. The process of claim 6, wherein second catalyst comprises at least one metallocene catalyst.

9. The process of claim 6, wherein said at least one diene comprises 1,9-decadiene or vinyl norbornene.

10. The process of claim 6, wherein said at least one diene comprises norbornadiene.

11. A process for producing an in-reactor polymer blend, the process comprising:
(i) contacting a first monomer composition comprising ethylene, from 0.01 to 10 mole % of one or more dienes selected from the group consisting of $C_6$ to $C_{12}$ α,ω-dienes, norbornadiene, vinylnorbornene, and mixtures thereof and optionally propylene, butene, pentene hexene or mixtures thereof in a first polymerization stage with a metallocene first catalyst which is capable of polymerizing said first monomer composition to produce a first polymer and which is also capable of incorporating said diene into the first polymer such that the product of the first polymerization stage is an ethylene-containing first polymer comprising more than one olefinic unsaturation per chain and from 0.1 to 10 mole % diene; and
(ii) contacting at least part of the product of the first polymerization stage with a second monomer composition comprising propylene and optionally ethylene in a second polymerization stage with a second catalyst which is capable of polymerizing said second monomer composition to produce a second polymer and which is also capable of incorporating branches of said first polymer onto said second polymer at said olefinic unsaturation, wherein said second monomer composition has different ethylene concentration than the first monomer composition.

12. The process of claim 11, wherein said first polymerization stage is conducted in the presence of hydrogen.

13. The process of claim 11, wherein second catalyst comprises at least one metallocene catalyst.

14. The process of claim 11, wherein said at least one diene comprises norbornadiene.

* * * * *